United States Patent [19]

Shishizuka et al.

[11] Patent Number: 5,721,884
[45] Date of Patent: Feb. 24, 1998

[54] APPARATUS FOR COMBINING AND SEPARATING COLOR COMPONENT DATA IN AN IMAGE PROCESSING SYSTEM

[75] Inventors: Junichi Shishizuka, Tokyo; Yoshinobu Mita; Yoshihiro Ishida, both of Kawasaki; Miyuki Enokida, Yokohama, all of Japan

[73] Assignee: Canon Kabushiki Kaisha, Tokyo, Japan

[21] Appl. No.: 312,931

[22] Filed: Sep. 30, 1994

Related U.S. Application Data

[63] Continuation of Ser. No. 34,218, Mar. 19, 1993, abandoned, which is a continuation of Ser. No. 437,031, Nov. 15, 1989, abandoned.

[30] Foreign Application Priority Data

Nov. 17, 1988 [JP] Japan .................. 63-288871
Jan. 6, 1989 [JP] Japan .................. 64-000497

[51] Int. Cl.$^6$ .................................................. G06F 19/02
[52] U.S. Cl. ........................... 395/511; 395/405; 395/508
[58] Field of Search .................. 364/200 MS, 900 MS; 395/400, 425, 131, 508, 511, 405, 428, 842; 345/150, 151, 153, 154, 155, 186, 187; 358/515

[56] References Cited

U.S. PATENT DOCUMENTS

| | | | |
|---|---|---|---|
| 3,961,324 | 6/1976 | Cousin et al. | 340/324 AD |
| 4,016,544 | 4/1977 | Morita et al. | 395/164 |
| 4,439,760 | 3/1984 | Fleming | 340/799 |
| 4,635,049 | 1/1987 | Dodge et al. | 340/703 |
| 4,773,026 | 9/1988 | Takahara et al. | 345/186 |
| 4,801,930 | 1/1989 | Tsuchiya et al. | 340/703 |
| 4,805,013 | 2/1989 | Dei et al. | 358/80 |
| 4,850,028 | 7/1989 | Kawamura et al. | 382/46 |
| 4,862,154 | 8/1989 | Gonzalez-Lopez | 340/747 |
| 4,878,166 | 10/1989 | Johnson et al. | 395/307 |
| 4,885,699 | 12/1989 | Taoda et al. | 364/158 |
| 4,896,146 | 1/1990 | Narumiya | 345/186 |
| 4,908,779 | 3/1990 | Iwata | 395/131 |
| 5,038,300 | 8/1991 | Seiler et al. | 395/131 |
| 5,086,408 | 2/1992 | Sakata | 395/600 |
| 5,089,811 | 2/1992 | Leach | 340/703 |
| 5,140,312 | 8/1992 | Ishii | 345/157 |
| 5,181,014 | 1/1993 | Dahymple et al. | 345/150 |
| 5,201,037 | 4/1993 | Kohiyama | 395/164 |

*Primary Examiner*—Eddie P. Chan
*Assistant Examiner*—Hiep T. Nguyen
*Attorney, Agent, or Firm*—Fitzpatrick, Cella, Harper & Scinto

[57] ABSTRACT

In a memory-to-memory data transfer apparatus, each of a plurality of memories connected to a memory bus is sequentially selected, and data which occupy predetermined positions in the data read from the selected memory are combined into a set of data. The set of data is sequentially written while addresses in the remaining memory is being updated. Alternatively, a plurality of sets of data are sequentially read out while addresses in a memory are being updated, and data which occupy predetermined positions in the read data are combined into a set of data. The set of data is written while the remaining memories are being sequentially selected. The apparatus may have a plurality of memories connected to a data bus and address generators for generating unique addresses for each of the memories in accordance with a predetermined synchronizing signal. The apparatus, in preferred form, effects transfer of data in thinned-out form or phase-divided form by shifting a generated address or by adding a predetermined value to the address.

18 Claims, 19 Drawing Sheets

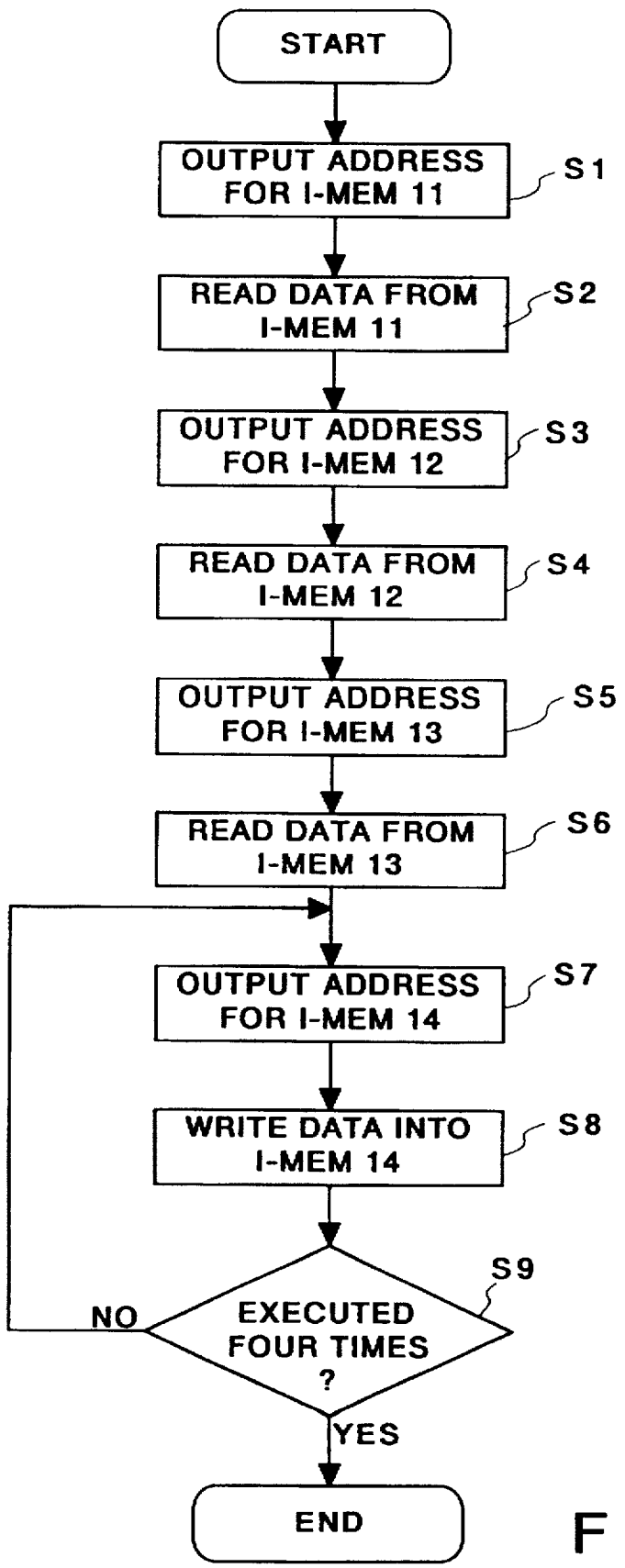
F I G. 4

| R/W | Y I1 | X I2 | C1 | O1 | O2 | O3 | O4 |
|---|---|---|---|---|---|---|---|
| X | 0 | 0 | 0 | 0 | 1 | 1 | 1 |
| X | 0 | 1 | X | 1 | 0 | 1 | 1 |
| X | 1 | 0 | X | 1 | 1 | 0 | 1 |
| X | 1 | 1 | X | 1 | 1 | 1 | 0 |
| W | 0 | 0 | 1 | 0 | 0 | 0 | 0 |
| R | 0 | 0 | 1 | 0 | 1 | 1 | 1 |

FIG. 21

| C4 | | Y0 | C3 | C2 |
|---|---|---|---|---|
| 0 | 0 | 0 | 1 | 0 |
| 0 | 0 | 1 | 0 | 0 |
| 0 | 1 | 0 | 1 | 1 |
| 0 | 1 | 1 | 0 | 1 |
| 1 | 0 | 0 | 1 | 1 |
| 1 | 0 | 1 | 0 | 0 |
| 1 | 1 | 0 | 1 | 1 |
| 1 | 1 | 1 | 1 | 1 |

FIG. 23

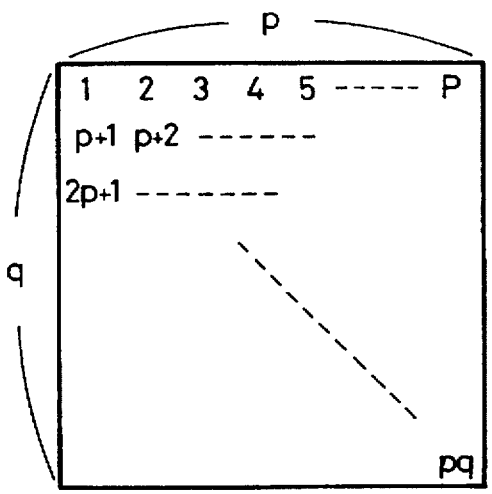
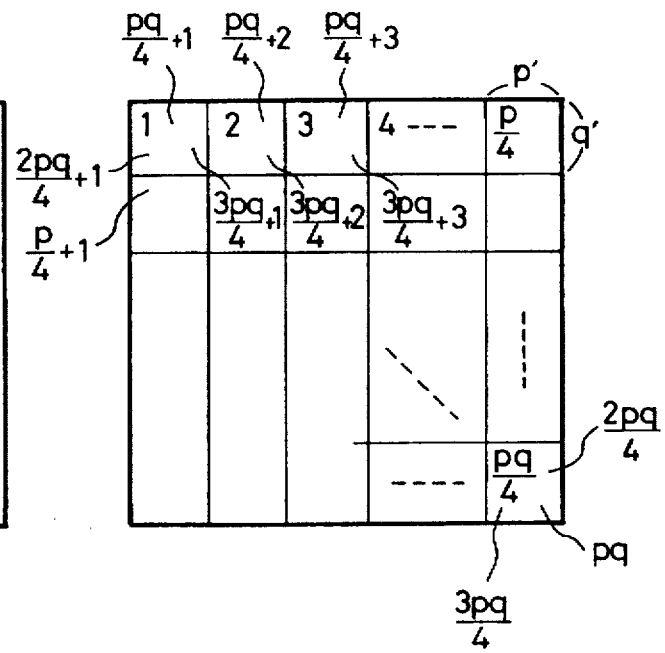
FIG. 24(A)  FIG. 24(B)
| R/W | I1 I2 | C1 | O1 O2 O3 O4 |
|---|---|---|---|
| X | 0  0 | 0 | 0  1  1  1 |
| X | 0  1 | 0 | 1  0  1  1 |
| X | 1  0 | X | 1  1  0  1 |
| X | 1  1 | X | 1  1  1  0 |
| W | 0  0 | 1 | 0  0  0  0 |
| R | 0  0 | 1 | 0  1  1  1 |
| W | 0  1 | 1 | 1  0  0  1 |
| R | 0  1 | 1 | 1  0  1  1 |
FIG. 25

1

APPARATUS FOR COMBINING AND SEPARATING COLOR COMPONENT DATA IN AN IMAGE PROCESSING SYSTEM

This application is a continuation of application Ser. No. 08/034,218 filed Mar. 19, 1993, now abandoned, which is a continuation of application Ser. No. 07/437,031 filed Nov. 15, 1989, which is now abandoned.

BACKGROUND OF THE INVENTION

The present invention relates generally to memory-to-memory data transfer apparatus and, more particularly, to a memory-to-memory data transfer apparatus for transferring data among a plurality of memories at a high rate.

In recent years, with the progress of image processing techniques, the amount of image data to be handled by computers has been increasing. For example, in a case where a color image processing system or the like is used to handle full-color digital image data, the method shown in FIG. 11(A) or 11(B) is employed. In the method of FIG. 11(A), sets of color data (for example, RGB data or YMC data) corresponding to individual color systems (such as an additive color mixture method and a subtractive color mixture method) are held in separate memory spaces. In the method of FIG. 11(B), these sets of color data are held in the same memory space.

Typically, when image data is to be input in units of, for example, R, G and B data, the memory arrangement shown in FIG. 11(A) is adopted. This arrangement enables the image data to be edited in units of image memories (frame memories). As shown in FIG. 11(B), image data such as RGB data may also be stored in the same memory space. This memory arrangement has the advantage that the three color image data can be written or read at the same time.

As is apparent from the foregoing, it is desirable that the form of memory space which stores image data can be freely set in accordance with the characteristics or the like of the system. However, no circuit capable of efficiently transferring data among the memory spaces described above has been proposed. For example, if the R, G and B image data stored in the respective memory spaces shown in FIG. 11(A) are to be transferred to the memory space shown in FIG. 11(B), a large number of memory accesses are required and an excessively long time has heretofore been required for address conversion, data conversion and the like.

In a conventional image processing apparatus or the like, it is common practice to transfer an enormous amount of image data by means of a CPU or by separate hardware which is arranged in pipeline-like form. However, if the transfer of the image data is executed by the CPU, the transfer rate becomes extremely low. If the image data is transferred over separate pipelines, double bus lines are needed and a large-scale arrangement is therefore required. Moreover, a known type of direct memory access controller (DMA) periodically occupies the system bus of the CPU, with the result that the processing in the CPU may be affected.

SUMMARY OF THE INVENTION

It is therefore an object of the present invention to eliminate the disadvantages involved in the conventional arts described above.

It is another object of the present invention to provide a memory-to-memory data transfer apparatus capable of packing or unpacking data among memories.

It is another object of the present invention to provide a memory-to-memory data transfer apparatus capable of transferring a large amount of data among memories without affecting any processing in the CPU.

According to the present invention, there is provided a memory-to-memory data transfer apparatus which comprises a plurality of memories connected to a memory bus, reading means for sequentially selecting each of said plurality of memories and reading data from said selected memory, latch means for latching each data read out by said reading means, selecting means for sequentially selecting each of sets of data including data which occupy predetermined positions in said latch means, and writing means for sequentially writing each of said sets of data selected by said selecting means into any one of said plurality of memories. The foregoing makes it possible to easily achieve packing-transfer of data.

Further, according to the present invention, there is also provided a memory-to-memory data transfer apparatus which comprises a plurality of memories connected to a memory bus, reading means for sequentially reading a plurality of sets of data from any one of said memories, latch means for latching each data read out by said reading means, selecting means for sequentially selecting each of sets of data including data which occupy predetermined positions in said latch means, and writing means for sequentially selecting each of said plurality of memories and writing each of said sets of data selected by said selecting means into said selected memory. The foregoing makes it possible to easily achieve unpacking-transfer of data.

Further, according to the present invention, there is also provided a memory-to-memory data transfer apparatus which comprises a plurality of memories connected to a data bus, and a plurality of address generating means for generating unique addresses for each of said memories in accordance with a predetermined synchronizing signal. The foregoing makes it possible to transfer a large amount of data without affecting any processing in a CPU.

In a preferred embodiment, the memory-to-memory data transfer apparatus further comprises a system bus connected to a CPU, first bus connecting means for connecting, under the control of said CPU, one of said data bus and a data bus in said system bus to a data bus for said memory, and second bus connecting means for connecting, under the control of said CPU, one of an address bus for said unique generated address and an address bus in said system bus to an address bus for said memory. The foregoing makes it possible to achieve various types of data transfer control by means of the CPU.

In a preferred embodiment, the address generating means includes row counting means for counting a horizontal synchronizing signal which is supplied after said row counting means have been initialized by a vertical synchronizing signal, column counting means for counting a clock signal supplied after said column counting means has been initialized by said horizontal synchronizing signal. The foregoing makes it possible to easily handle transfer of image data.

In a preferred embodiment, the address generating means is provided with shifting means for shifting, under the control of said CPU, the output of said row counting means or said column counting means. The foregoing makes it possible to transfer data in partially omitted(thinned-out) form or the like.

In a preferred embodiment, the address generating means further includes adding means for adding, under the control of said CPU, the output of said shifting means to a predetermined value. The foregoing makes it possible to easily transfer data in partially omitted form in which the phase of the data is offset.

In a preferred embodiment, at least one of the address generating means is provided with inhibiting means for sensing the completion of transfer of a predetermined amount of data and inhibiting data writing to a corresponding memory. The foregoing makes it possible to prevent extra data from being written into the memory.

In a preferred embodiment, at least one memory is made from a dual port random access memory and has a random access port connected to said data bus and a serial access port connected to display means for displaying the contents stored in said memory. According to this preferred form, when data is transferred, the contents of the data can be simultaneously displayed.

In a preferred embodiment, the serial access port includes latch means for latching data, which is read from the memory in the X direction, in accordance with a first clock signal or another clock signal which is obtained by frequency-dividing said first clock signal, and address updating means for updating addresses which are read from said memory in the Y direction at intervals of one or two addresses. The foregoing makes it possible to display image data with a resolution which corresponds to the density at which data is sampled and transferred.

In a preferred embodiment, the memory includes a plurality of memory blocks, and the address generating means includes counting means for counting a predetermined synchronizing signal, address converting means for converting the bit array of the output of said counting means and generating X and Y addresses for addressing said memory blocks, and selecting means for selecting said memory blocks by decoding predetermined bits in said generated X and Y addresses. The foregoing makes it possible to implement various forms of data transfer by means of a simple construction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a flow chart which shows the operation of a CPU 15 when data for four pixels are to be read from the respective image memories 11 to 13 and transferred to the image memory 14 in packed form;

FIG. 21 is a view showing a truth table for use in a decoder 105 in the sixth embodiment;

FIG. 23 is a view showing a truth table for use in a converter 116 in the seventh embodiment;

FIGS. 24(A) and 24(B) are views which serve to illustrate the operation of transferring image data in the sixth embodiment; and FIG. 25 is a view which shows another example of a truth table for the decoder 105 in the sixth embodiment.

DESCRIPTION OF THE PREFERRED EMBODIMENT

Embodiments of the present invention will be explained in detail below with reference to the accompanying drawings.

[FIRST EMBODIMENT]

(Explanation of Image Processing Apparatus (FIGS. 1 and 2))

Figure 1:
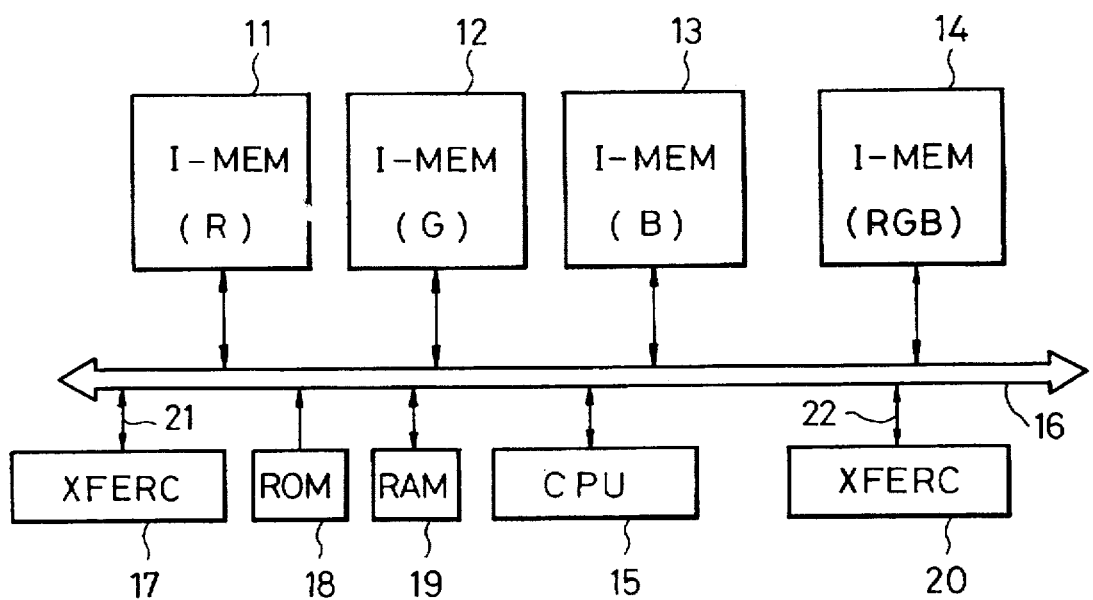
FIG. 1 is a block diagram showing an image processing apparatus to which a first embodiment of the present invention is applied.

FIG. 1 is a block diagram showing an image processing apparatus to which a first embodiment of the present invention is applied. The illustrated image processing apparatus includes image memories (I-MEM(s)) 11, 12, 13 and 14. The image memories 11, 12 and 13 store red (R) image data, green (G) image data and blue (B) image data, respectively, while the image memory 14 store R, G and B data in each address in packed form. A CPU 15 provides control over the transfer of data between the individual image memories, and executes control in accordance with a control program stored in a ROM 18. A RAM 19 is used as a work area by the CPU 15.

Figure 3:
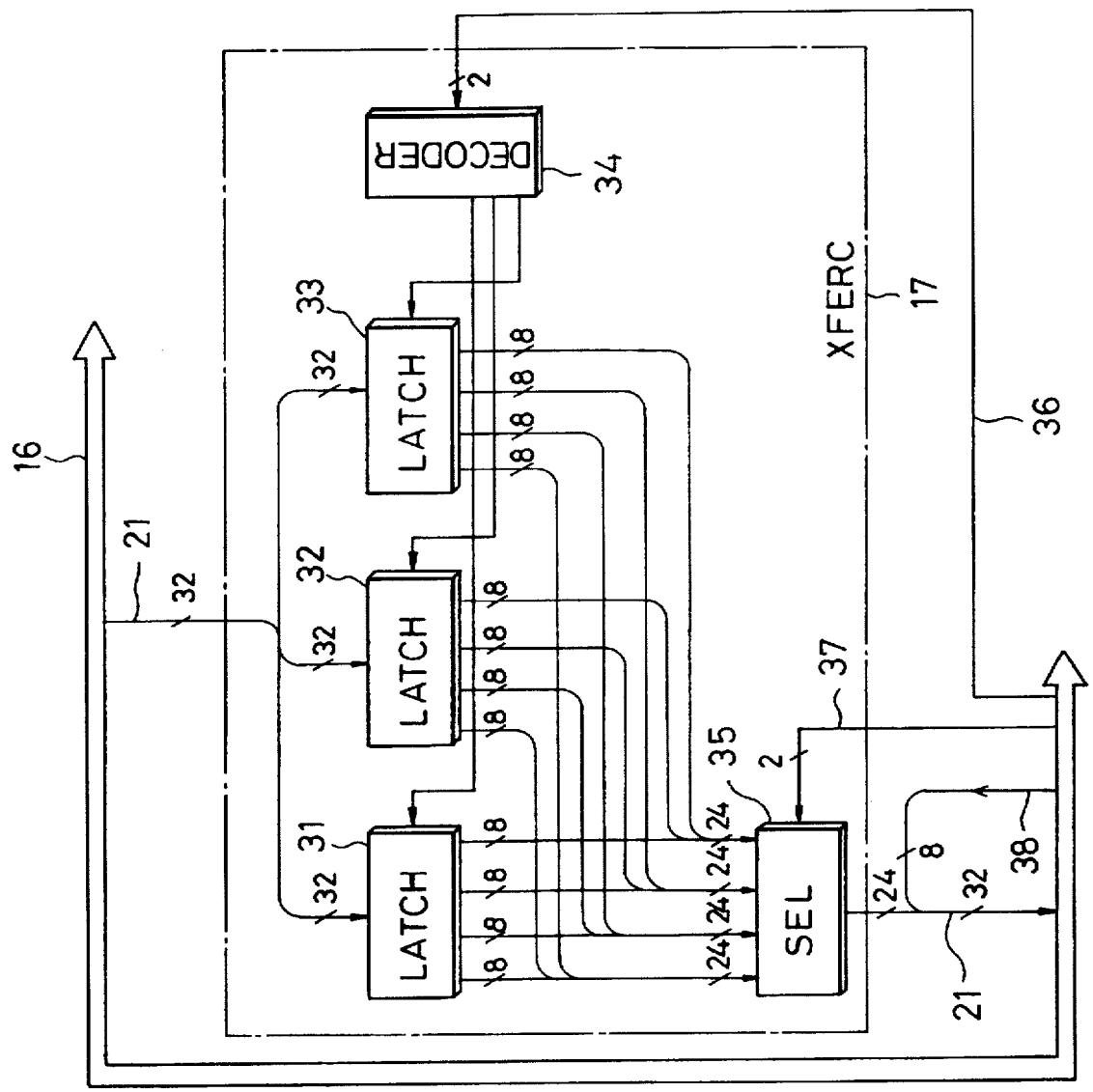
FIG. 3 is a block diagram showing a data transfer circuit 17 in the first embodiment.

A data transfer circuit (XFERC) 17, which is shown in detail in FIG. 3, serves to transfer the individual color image data read from the image memories 11–13 to the image memory 14 in packed form. A data transfer circuit (XFERC) 20, which is shown in detail in FIG. 5, serves to unpack the packed R, G and B data read from the image memory 14 into individual R, G and B data and transfer these individual color data to the corresponding image memories 11, 12 and 13. A bus 16 constitutes a system bus for the CPU 15, and includes a 20-bit address bus, a 32-bit data bus, a control bus and the like.

Figures 2A, 2B:
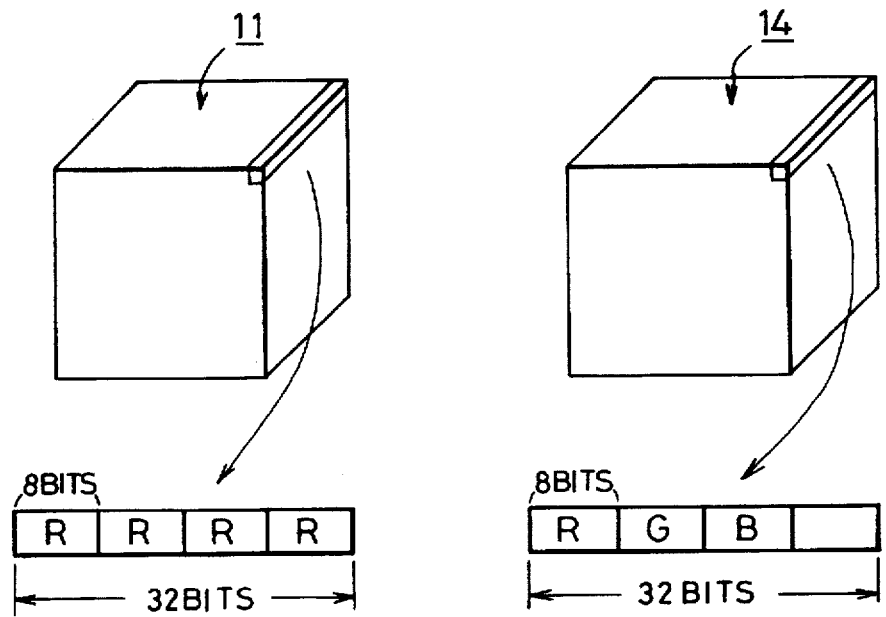
FIGS. 2(A) and 2(B) are views showing the arrays of data stored in respective image memories 11 and 14 in the first embodiment.

FIG. 2(A) is a view showing a data array in the image memory 11. In this data array, each pixel consists of 8-bit R data, and R data (32 bits) for four pixels is stored in the image memory 11. Similarly, the image memory 12 stores G data for four pixels in one address, and the image memory 13 stores B data for four pixels in one address.

FIG. 2(B) is a view showing the data array of the image memory 14. This image memory 14 stores RGB data for one pixel in one address in packed form as shown in FIG. 2(B). Accordingly, in the case of the data array shown in FIG. 2(A), a color image formed from these image data is formed by the three image memories 11, 12 and 13, while, in the case of the data array shown in FIG. 2(B), such a color image is formed from the contents of the image memory 14 alone.
(Explanation of Data Transfer Circuit 17 (FIGS. 3 and 4))

FIG. 3 is a block diagram showing the data transfer circuit 17 used in the first embodiment. The illustrated data transfer circuit 17 includes latch circuits (LATCH) 31, 32 and 33 for holding image data read from the respective image memories 11, 12 and 13, a decoder (DECODER) 34 arranged to input the two most significant bits (shown at 36) of address data on the system bus 16 and to determine which of the latch circuits 31–33 is set to an enable mode during reading from the image memory 11, 12 or 13. The data transfer circuit 17 also includes a selector (SEL) 35. At the time of writing to the image memory 14, the selector 35 similarly inputs the two most significant bits (shown at 37) of address data on the system bus 16 to select which pixel of the R, G and B data stored in the respective latch circuits 31, 32 and 33 should be output to the system bus 16. Reference numeral 38 denotes 8-bit data on the data bus and, since the selector 35 outputs 24-bit data, it is possible to add, as required, appropriate data to the remaining 8 bits coming from the data bus.

FIG. 4 is a flow chart which shows the operation of the CPU 15 when R, G and B data for four pixels are to be read from the respective image memories 11–13 and transferred to the image memory 14 in packed form. A control program used for executing this operation is stored in the ROM 18.

In Step S1, the first address data for the image memory 11 is output. At this time, if the two most significant bits of the address data is, for example "00", the latch circuit 31 is selected by the decoder 34. In Step S2, image data is read from one address in the image memory 11, and the thus read 32 bit (four pixels) R data is stored in the latch circuit 31.

In Step S3, "01" is placed at the two most significant bits of the address data, and the address for the image memory 12 is read. In Step S4, 32-bit G data is read from the image memory 12 and the 32-bit G data is similarly held in the latch circuit 32. Likewise, in Step S5, address data for the image memory 13 (the data of the two most significant bits: "10") is output and, in Step S6, corresponding image data is read from the image memory 13. The read 32-bit B data is stored in the latch circuit 33. In this manner, the 32-bit R, G and B data are held in the latch circuits 31, 32 and 33, respectively.

In Step S7, the address in the image memory 14 to which the above data are to be transferred is output. In the meantime, 24-bit data which consists of packed R, G and B data is, as shown in FIG. 2(B), input to each input stage of the selector 35, while the two most significant bits of the address data are input to a select terminal of the selector 35. By changing the two-most-significant-bit data from "00" to "11", data corresponding to four pixels can be sequentially selected. In Step S8, a write signal for the image memory 14 is output and image data for one pixel can thereby be written into the image memory 14. Moreover, the process proceeds to Step S9, where it is determined whether Steps S7 and S8 have been repeated four times. If they have not yet been repeated four times, the process returns to Step 7 to execute the write process of Steps 7 and 8. In this manner, by repeating Steps 7 and 8, the RGB data for four pixels can be written into the image memory 14.

Incidentally, the CPU 15 may also be provided with, instead of the 8-bit data bus 38, an 8-bit register in which data can be set by the CPU 15.

In the above-described embodiment, of the 20-bit address data, the two most significant bits are input to the decoder 34 and the selector 35. In addition, two bits which follow the two most significant bits are decoded by a decoder (not shown), and the decoded signal is utilized as a select signal for selection of the image memory 11, 12, 13 or 14 in read/write mode. This process is likewise used in a data transfer circuit 20 which will be described below.

As is apparent from the foregoing, with the data transfer circuit 17, it is possible to transfer sets of data, which are respectively held in separate memory spaces, to the same memory space in packed form.
(Explanation of Data Transfer Circuit 20 (FIGS. 5 and 6))

Figure 5:
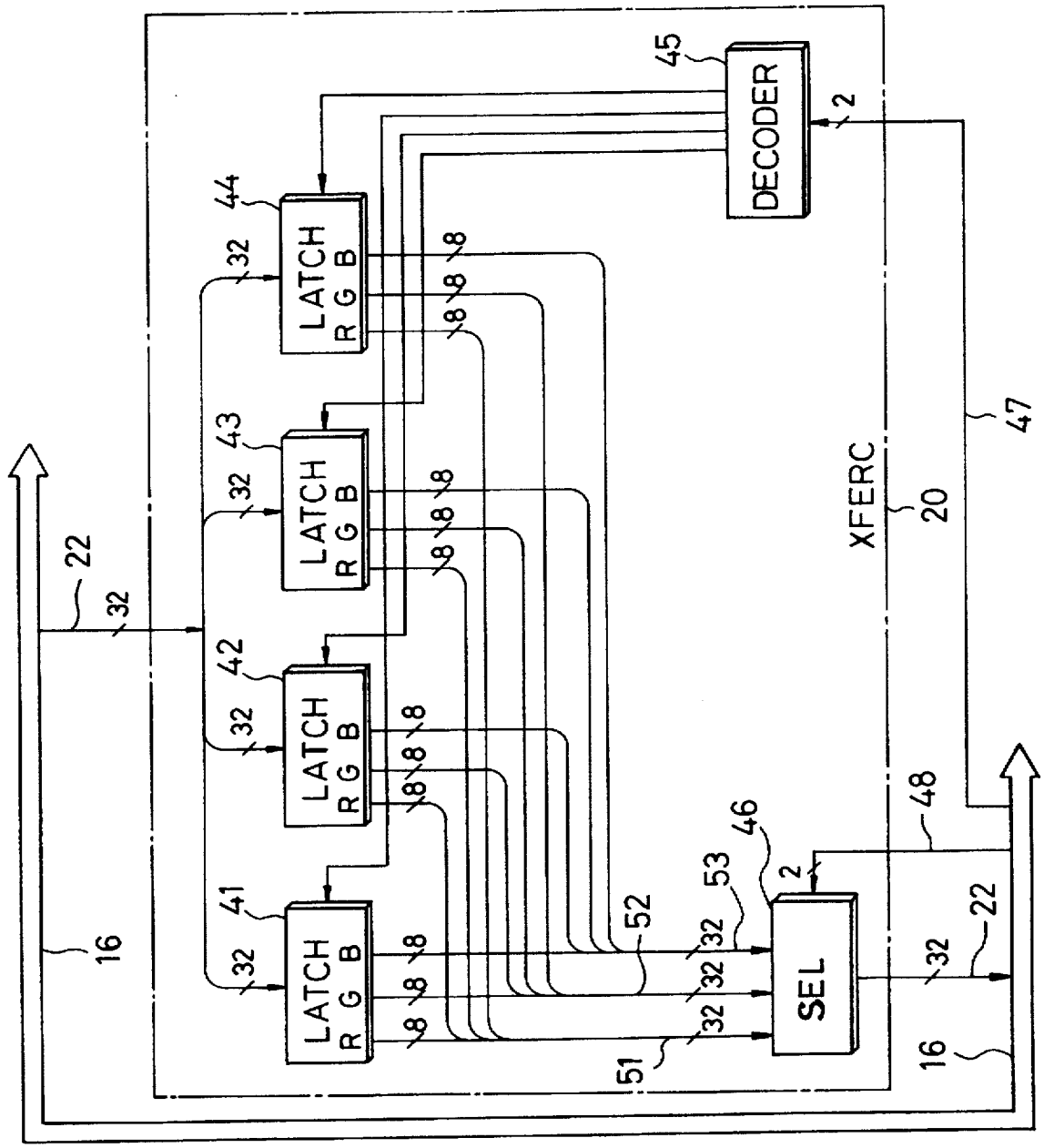
FIG. 5 is a block diagram showing a data transfer circuit 20 in the first embodiment.

FIG. 5 is a block diagram showing the data transfer circuit 20 used in the first embodiment. In the figure, the two most significant bits of address data for the image memory 14 are shown at 47. This two-most-significant-bit data is input to a decoder (DECODER) 45, where it is used for selecting from among latch circuits 41 to 44. Each of the latch circuits (LATCH) 41 to 44 latches 24-bit RGB data. A selector (SEL) 46 receives the two most significant bits (shown at 48) of address data on an address bus to select one from among the 32-bit R, G and B data. Reference numeral 22 denotes a data bus connected to the system bus 16.

Figure 6:
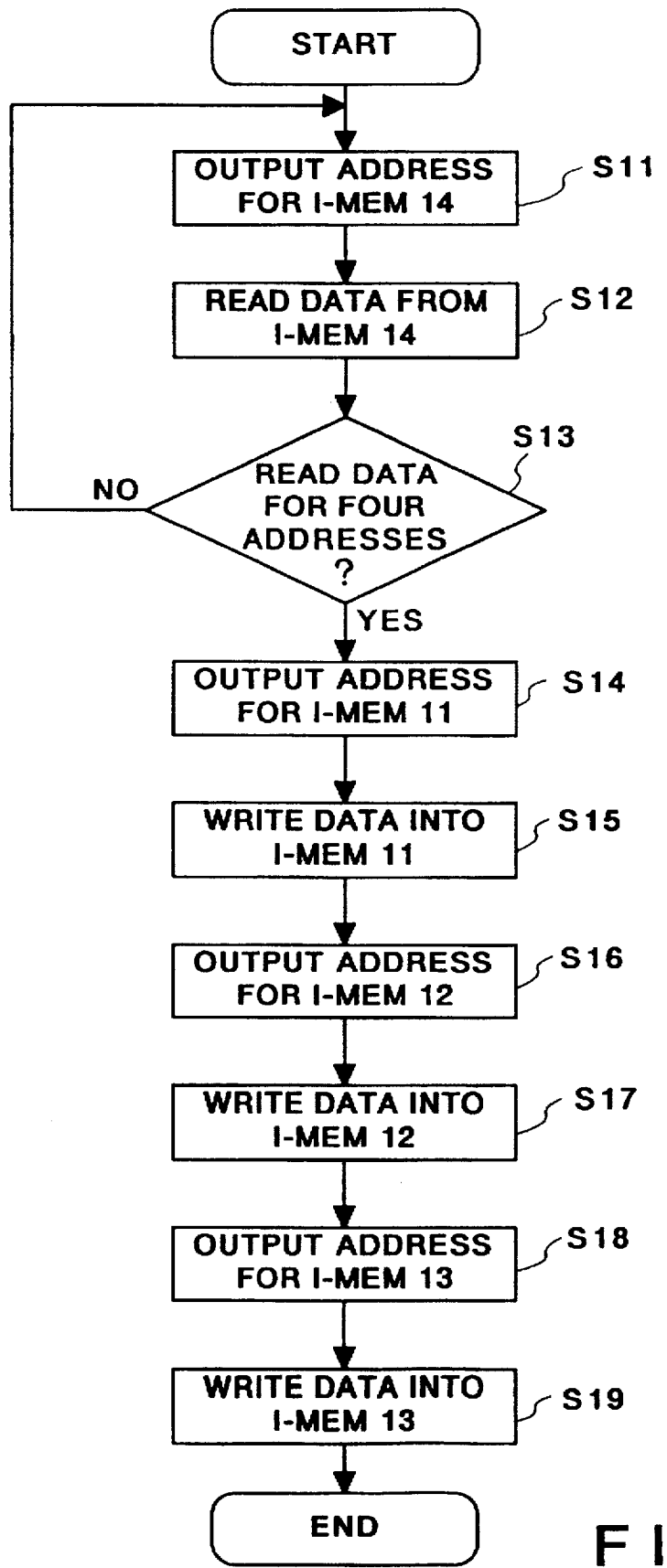
FIG. 6 is a flow chart which shows the operation of the CPU 15 when data for four pixels are to be read from the image memory 14 and transferred to the image memories 11-13 in unpacked form.

FIG. 6 is a flow chart which shows the operation of the CPU 15 when data for four pixels are to be read from the image memory 14 and transferred to the image memories 11, 12 and 13 in unpacked form. A control program used for executing this control operation is stored in the ROM 18.

In Step S11, an address for the image memory 14 is output. At this time, by placing "00" at the two most significant bits of the address data, the latch circuit 41 is selected. Then, in Step S12, image data for one pixel is read from the image memory 14. The read data is in a packed form as shown in FIG. 2(B). Then, in Step S13, it is determined whether data for four addresses have been read from the image memory 14. If the data have not yet been read, the process proceeds to Step S11, where the address in the image memory 14 is updated. Simultaneously, "01" is placed at the two most significant bits of the address data (the latch circuit 42 is selected) and, in Step S12, the data is read out.

When image data for four pixels are latched in the latch circuits 41–44 in the above-described manner, then 32-bit R data such as that shown in FIG. 2(A) appears on a data line 51, 32-bit G data on a data line 52, and 32-bit B data on a data line 53. When the image data for four pixels are read from the image memory 14, the process proceeds to Step S14, where address data for the image memory 11 is output. At this time, the two most significant bits 48 of the address data are, for example, "00", thereby selecting R data on the line 51. Then, in Step S15, the image memory 11 is selected and a write signal is output, whereby 32-bit R data such as that shown in FIG. 2(A) is written into the image memory 11.

Similarly, in Step S16, a write address for the image memory 12 is output, and the G data on the data line 52 is selected in accordance with the two most significant bits 48 of the write address. In Step S17, a write signal for the image memory 12 is output and the 32-bit G data is thereby written into the image memory 12. Similarly, an address for the image memory 13 is output in Step S18 and a write signal for the image memory 13 is then output in Step S19, whereby the 32-bit B data is written into the image memory 13.

As described above, the data transfer circuit 20 is arranged so that the packed R, G and B data is successively read from the image memory 14 four times, then this data is unpacked into individual R, G and B color data, and then these individual color data are written into the corresponding color image memories. It is therefore possible to easily transfer the 32-bit R, G and B data to the corresponding image memories.

Although the above explanation refers to the transfer of R, G and B image data, the type of data which can be handled is not limited to the aforementioned image data. For example, Y, M and C color image data can also be transferred between memories in a similar manner.

[Second Embodiment (FIGS. 7–9)]

Figure 7:
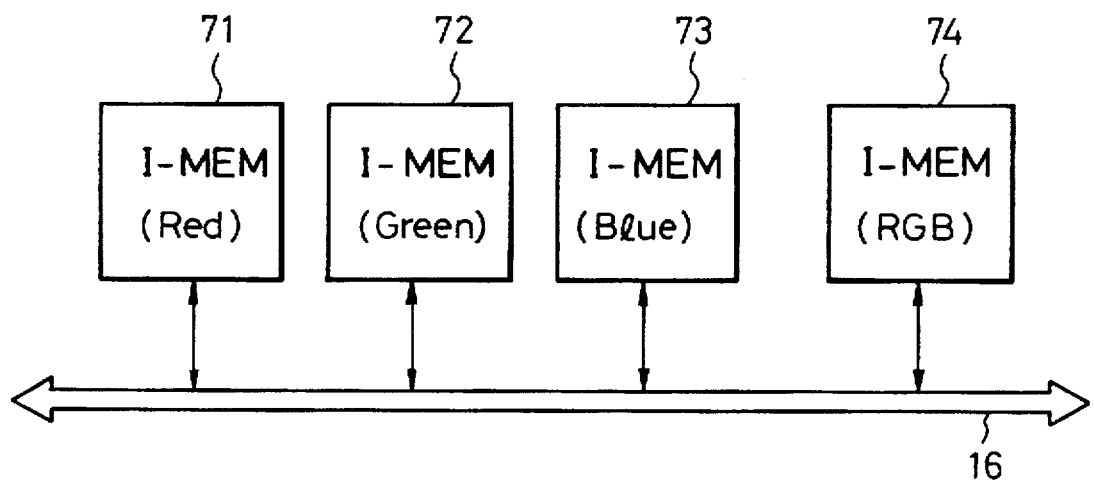
FIG. 7 is a block diagram which serves to illustrate a second embodiment of the present invention.

FIG. 7 is a block diagram which serves to illustrate a second embodiment of the present invention. The second embodiment relates to the data transfer between each image memory 71–73 and an image memory 74. The embodiment is arranged so that, when image data is to be transferred over the bus 16, the image data is input in accordance with an operation, such as data selection, masking or the like, which is executed on the side on which the image data is input.

First of all, the operation of transferring the image data stored in the image memories 71–73 to the image memory 74 will be explained. The input part of the image memory 74 is provided with a circuit such as that shown in FIG. 8.

Initially, image data is read from one address in the image memory 71, and the image data is input into the image memory 74 over the bus 16. In this image data, the R data consists of four pieces of 8-bit data as shown in FIG. 2(A).

Figure 8:
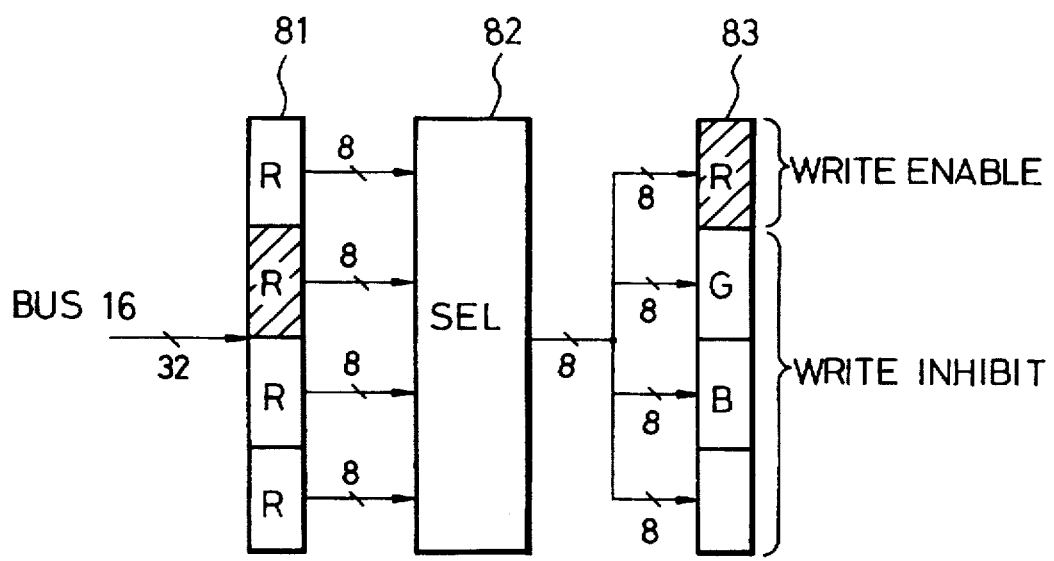
FIG. 8 is a block diagram which serves to illustrate the data packing transfer in the second embodiment.

Referring to FIG. 8, the 32-bit image data input to the image memory 74 is latched by a latch circuit 81. A selector 82 serves to select 8 bits from among the 32 bits and the selected 8-bit data is output to a memory 83. At this time, the same 8-bit data is delivered to the R, G and B areas of the memory 83 as shown in FIG. 8. However, since, of the 32 bits, the 24 bits excluding the R area (shaded part) are set to a write inhibit state, the R data can be written into only the desired R area of the memory 83.

Then, the selector 82 selects the next R data of the latch circuit 81 and the address of a write pixel in the image memory 83 is incremented. Thus the R date is written into the corresponding write enable area in the next pixel. As shown in FIG. 8, 32-bit data of R is input into the latch circuit 81 and particular R data (shaded part) is selected by the selector 82. When this R data is to be written into the memory 83, the 8-bit R data shown as the shaded part is supplied to the R, G and B write enable areas of the memory 83. However, as described above, since the parts excluding the R write area are set to a write inhibit state, the 8-bit R data is written into the 8-bit R area shown as the shaded part.

Figure 9:
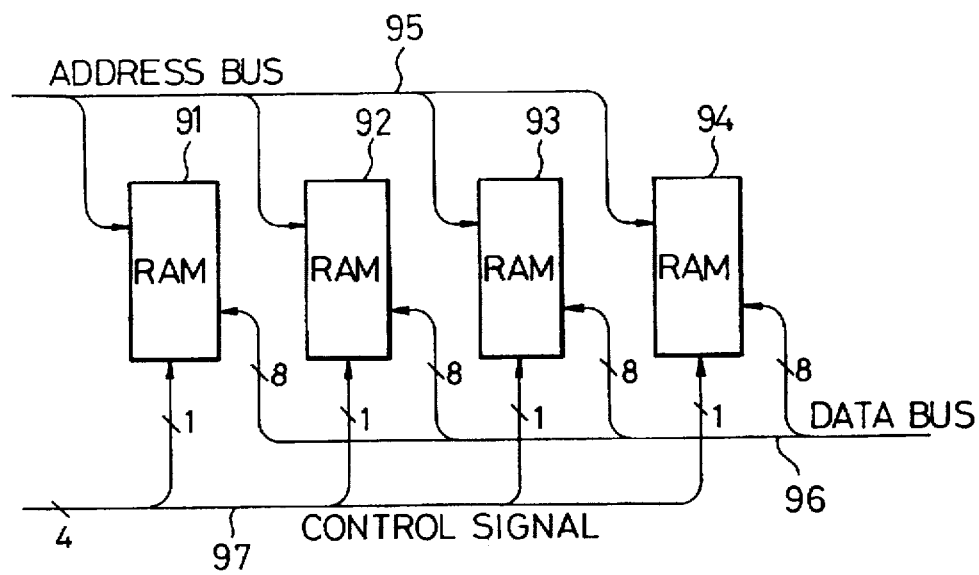
FIG. 9 is a block diagram showing an arrangement for setting memories to write enable/write inhibit modes in the second embodiment.

FIG. 9 is a block diagram showing an arrangement for setting memories to a write enable/write inhibit state in the second embodiment. The illustrated arrangement includes random access memories (RAM(s)) 91, 92, 93 and 94, an address bus 95, a data bus 96 and a control signal line 97. When address data is output to the address bus 95, this address data is output to the RAMs 91 to 94 as respective address signals. In this case, it may be assumed that 8-bit R, G and B data are written into the RAMs 91 to 93, respectively. Accordingly, if only 8-bit R data from among the input 32 bits is to be written into the RAM 91, a signal which allows the RAM 91 alone to assume a write enable state is output to the control signal line 97. Similarly, if only 8-bit G data from among the input 32 bits is to be written into the RAM 92, a signal which allows the RAM 92 alone to assume a write enable state is output to the control signal line 97.

The following is an explanation of a case where the image data held in the same memory space of the image memory 74 of FIG. 7 is transferred to the image memories 71, 72 and 73 which constitute separate memory spaces each corresponding to a different color.

Figure 10:
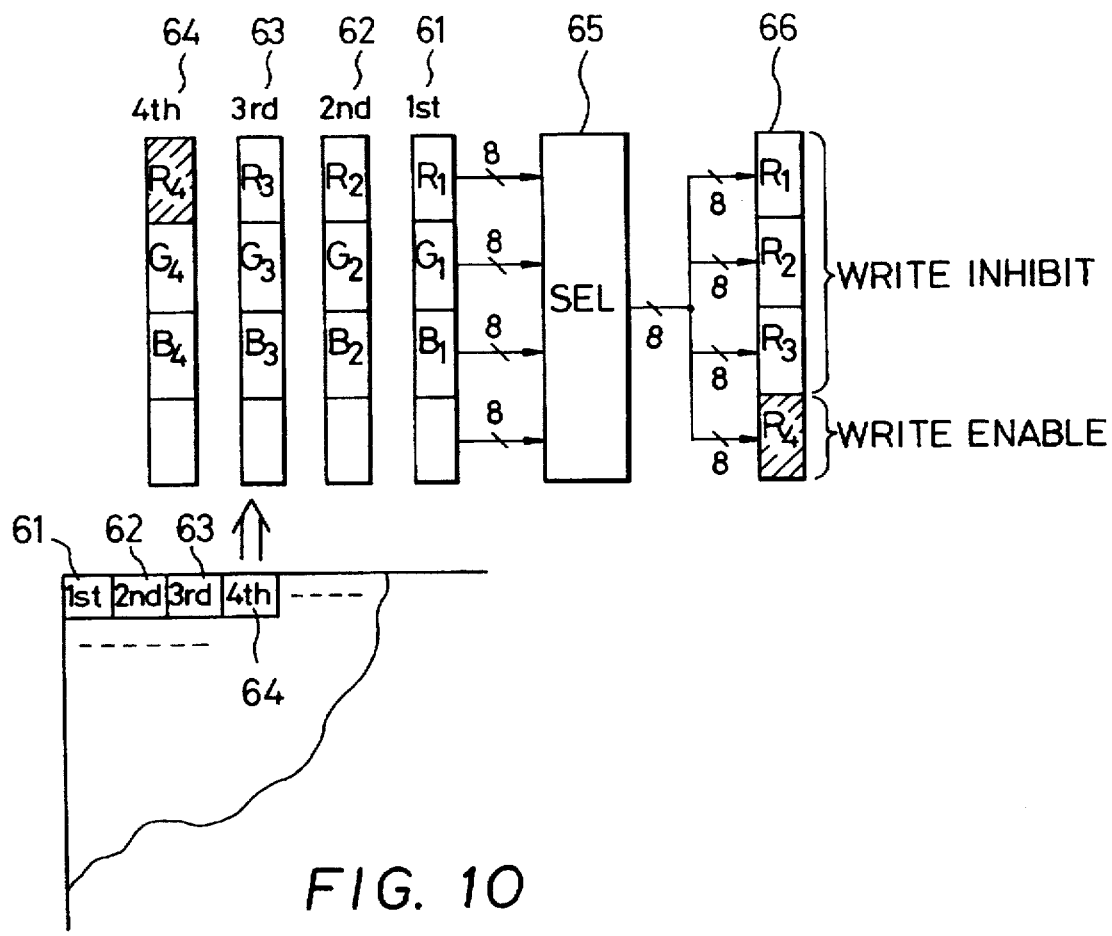
FIG. 10 is a schematic view which serves to illustrate data transfer between different memory spaces in the second embodiment.
Figure 11A:
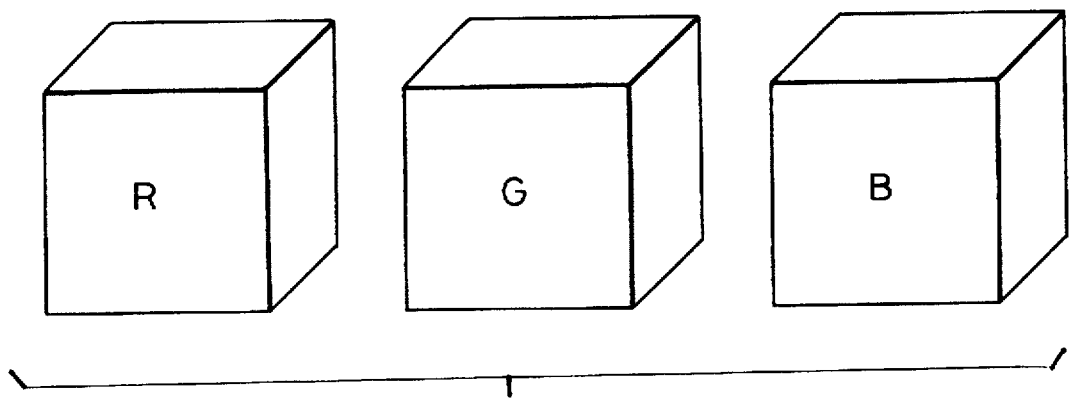
FIGS. 11(A) and 11(B) are schematic views which respectively serve to illustrate an arrangement in which color image data are stored in separate memory spaces and an arrangement in which color image data are stored in the same memory space.
Figure 11B:
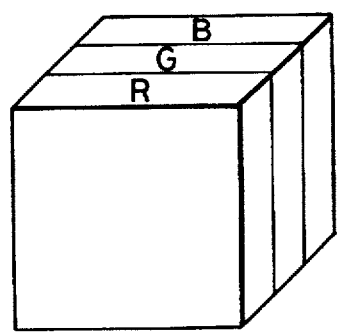

Referring to FIG. 10, 32-bit data is read from a first pixel 61 (containing packed R, G and B data) which occupies the same memory space in the image memory 74. Then, the selector 65 selects 8-bit $R_1$ data and writes the $R_1$ data in the first pixel to address 66 in the image memory 71. Then, the 32-bit data at a second pixel 62 is input to the selector 65, where $R_2$ data is selected. In a similar manner, the $R_2$ data is written into only an $R_2$ area at address 66, and so on. In this manner, the $R_1$ and $R_2$ data as well as $R_3$ and $R_4$ data (corresponding to four writing operations) are written into address 66 (32 bits) in the image memory 71, and the writing to address 66 in the image memory 71 is thereby completed.

Subsequently, a fifth pixel in the image memory 74 is selected and the next address in the image memory 71 is selected.

In this manner, only the R data in the image memory 74 is transferred to the separate memory spaces of the image memory 71, only the G data in the image memory 74 to the image memory 72, only the B data in the image memory 74 to the image memory 73. In consequence, the image data located in the same memory space in the image memory 74 can be transferred to the image memories 71, 72 and 73 as individual R, G and B data.

Although the above embodiment has been explained with reference to the example in which the type of data to be held in each memory is image data, the present invention is not limited to such an example.

As is apparent from the foregoing, in accordance with the present invention, there are provided a memory for storing a plurality of kinds of data in the same memory space in packed form and memories each of which stores a different kind of unpacked data, and the data transfer between the former memory and the latter memories is easily implemented.

[Third Embodiment]

Figure 12:
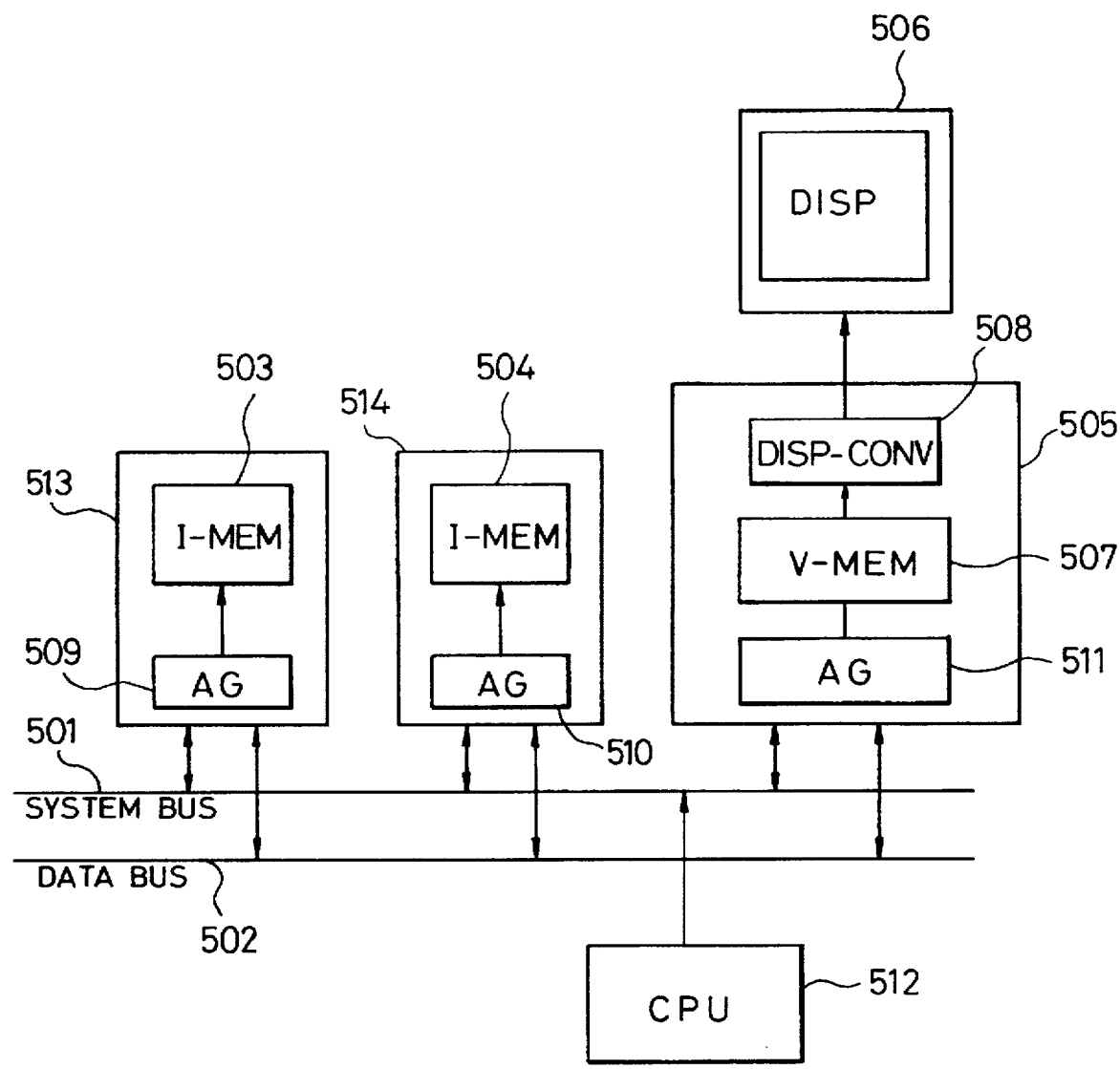
FIG. 12 is a block diagram showing an image processing apparatus to which a third embodiment is applied.

FIG. 12 is a block diagram showing an image processing apparatus to which a third embodiment of the present invention is applied. In the illustrated circuit, a system bus 501 is utilized by a CPU 512 for the purpose of transferring system data, system addresses, system control signals and the like. A data bus 502 is used to transfer image data, exclusively, between image memories. Image memory sections 513 and 514 store image data and execute transfer control of the image data. The image memory sections 513 and 514 respectively include image memories (IMEM(s)) 503 and 504 each of which stores image data for a maximum of 2048×2048 pixels. Address generators (AG) 509 and 510 execute unique address control for the purpose of high-rate transfer of image data. A display control section 505 receives transferred image data and provides control over the operation of displaying the image data. The display control section 505 includes an address generator (AG) 511 which executes unique address control for the purpose of receiving transferred image data. A video frame memory (V-MEM) 507 stores image (video) data corresponding to one display frame (for example, 1280×1024 pixels). A display converter (DISP-CONV) 508 converts the stored video data into an analog image signal. A display device 506 such as a CRT display device (DISP) displays an image in accordance with the analog image signal.

Figure 13:
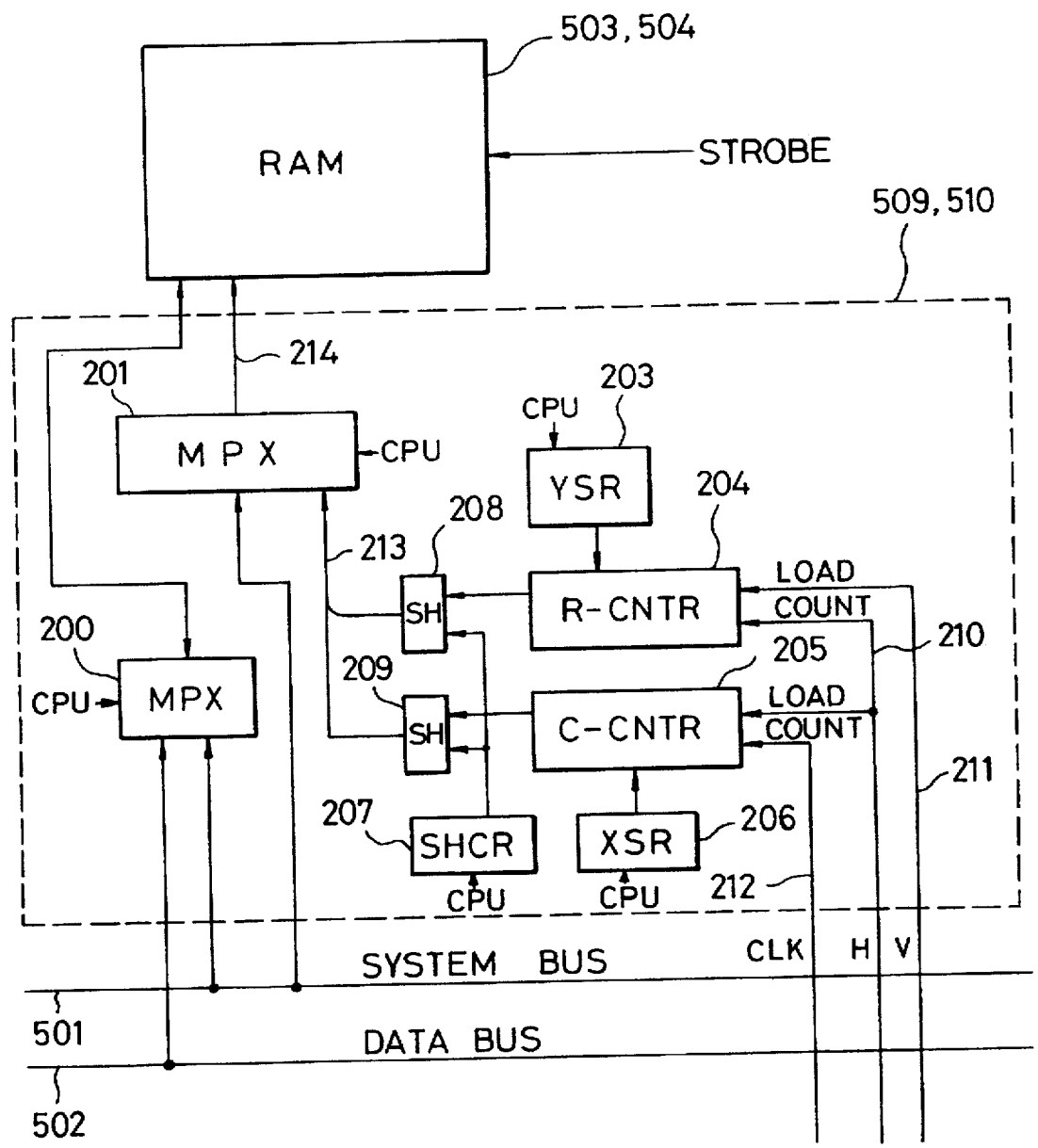
FIG. 13 is a block diagram showing an address generator 509 in the third embodiment.

FIG. 13 is a block diagram of the address generator 509 used in the third embodiment. Incidentally, this block diagram applies to the address generator 510. The address generator 509 performs the function of transferring image data. In FIG. 13, a bidirectional data multiplexer (MPX) 200 effects switching between system data and image data under the control of the CPU 512. A multiplexer (MPX) 201 likewise effects switching between system addresses and internal generated addresses under the control of the CPU 512. An image memory 503 consists of, for example, a dynamic RAM (DRAM), and reads or writes image data in accordance with a strobe signal at a high rate.

A Y register (YSR) 203 holds a Y (Row) transfer start address from the CPU 512. A row counter (R-CNTR) 204 loads the contents of the Y register 203 in response to a vertical synchronizing (V-Sync) signal 211 and is then incremented by one in response to a horizontal synchronizing (H-Sync) signal 210. An X register (XSR) 206 holds a X (Column) transfer start address from the CPU 512. A column counter (C-CNTR) 205 loads the contents of the X register 206 in response to a horizontal synchronizing (H-Sync) signal 210 and is then incremented by one in response to a clock (CLK) signal 212. Shifters (SH) 208 and 209 shift the outputs of the counters (internal generated address) 204 and 205 to a higher-order or lower-order side, respectively. A control register (SHCR) 207 holds shift-command information supplied from the CPU 512. More specifically, if "0" is set in the register 207, the shifters 208 and 209 provide no shift (0 bit), if "−1" is set in it, each of them provides a shift of one bit toward a lower-order side, and if "1" is set in it, each of them provides a shift of one bit toward a higher-order side.

Figure 14:
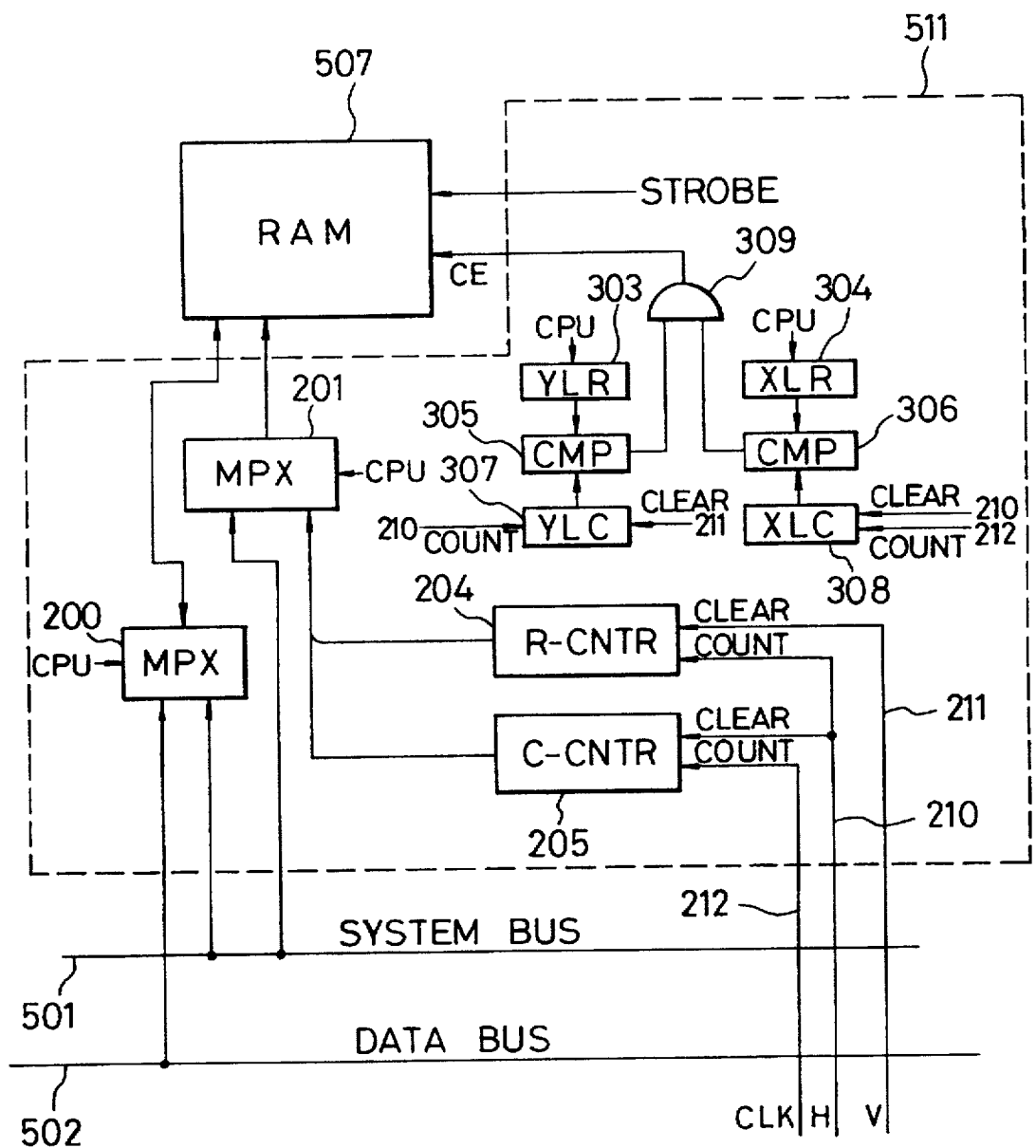
FIG. 14 is a block diagram showing an address generator 511 in the third embodiment.

FIG. 14 is a block diagram showing the address generator 511 used in the third embodiment. The address generator 511 performs the function of receiving image data. In the illustrated generator, the row counter 204 is cleared by the V-Sync signal 211 and is subsequently incremented by one in response to the H-Sync signal 210. The column counter 205 is cleared by the H-Sync signal 210 and is subsequently incremented by one in response to the clock signal 212.

A Y length register (YLR) 303 holds the Y length of image data to be transferred. The Y length is set by the CPU 512. A Y length counter (YLC) 307 is cleared by the V-Sync signal 211 and is subsequently incremented by one by the H-Sync signal 210. A comparator (CMP) 305 outputs a signal of a logic level "1" when the contents of the counter 307 are smaller than those of the Y length register 303. An X length register (XLR) 304 holds the X length of image data to be transferred. The X length is set by the CPU 512. An X length counter (XLC) 308 is cleared by the H-Sync signal 210 and is subsequently incremented by one by a clock signal 212. A comparator (CMP) 306 outputs a signal of a logic level "1" when the contents of the counter 308 are smaller than those of the X length register 304. An AND circuit 309 outputs a chip enable signal CE to a video frame memory (RAM) 507 when the outputs of the comparators 305 and 306 are both at a logic level "1". Accordingly, during this period, image data is written by a strobe signal.

A RAM 507 consists of, for example, a two-port RAM, and its serial access port output is connected to the display converter 508, while its random access port is connected to the side (MPX200) on which writing of image data is performed. With this arrangement, writing and reading of image data to and from the RAM 507 are performed at the same time, and monitoring of image data can therefore be performed at real time.

In the third embodiment, the Y length counter 307 may be omitted with the output of the row counter 204 connected to one input of the comparator 305, and also the X length counter 308 may be omitted with the output of the column counter 205 connected to one input of the comparator 306.

The following is an explanation of a specific example of image-data transfer in the third embodiment.
(Transfer of Image Data in Equimultiple Mode)

An image area corresponding to 1024×1280 pixels, which starts with an arbitrary address in the image memory 503, is transferred to the video frame memory 507 in equimultiple mode. In this case, the CPU 512 performs the following initialization.

Image Memory Section 513

XSR 206: X-transfer start address,

YSR 203: Y-transfer start address,

SHCR 207: 0,

MPX 200: connected to data bus, and

MPX 201: internal address mode.

Display Control Section 505

XLR 304: 1024,

YLR 303 : 1280,

MPX 200: connected to data bus, and

MPX 201: internal address mode.

After completion of the above initialization, when the CPU 512 starts the circuits, image data corresponding to 1024×1280 pixels, which starts with an address (X, Y) in the image memory 503, is transferred to an area which starts with an address (0, 0) in the video frame memory 507, whereby an equimultiple image is transferred. During this period, since the data bus 502 is only used, the processing executed by the CPU 512 is not affected.
(Transfer of Image Data in Thinned-out Mode)

Image data consisting of 2048×2048 pixels which starts with address (0, 0) in the image memory 504 is partially (periodically) omitted at a 1/2×1/2 magnification. This partially omitted image data is transferred to an area (1024×1024) which starts with address (0, 0) in the video frame memory 507. In this case, the CPU 512 performs the following initialization.

Image Memory Section 514

XSR 206: 0,

YSR 203: 0,

SHCR 207: +1,

MPX 200: connected to data bus, and

MPX 201: internal address mode.

Display Control Section 505

XLR 304: 1024,

YLR 303: 1024,

MPX 200: connected to data bus, and

MPX 201: internal address mode.

After completion of the above initialization, the CPU 512 starts the circuits. The ratio of omission is 1/2 in each of the X and Y directions since, in the image memory 504, a shift of one bit toward a higher-order position is performed in each of the X and Y directions.

[Fourth Embodiment]

A fourth embodiment relates to the transfer of image data among a plurality of image memory sections.

Figure 15:
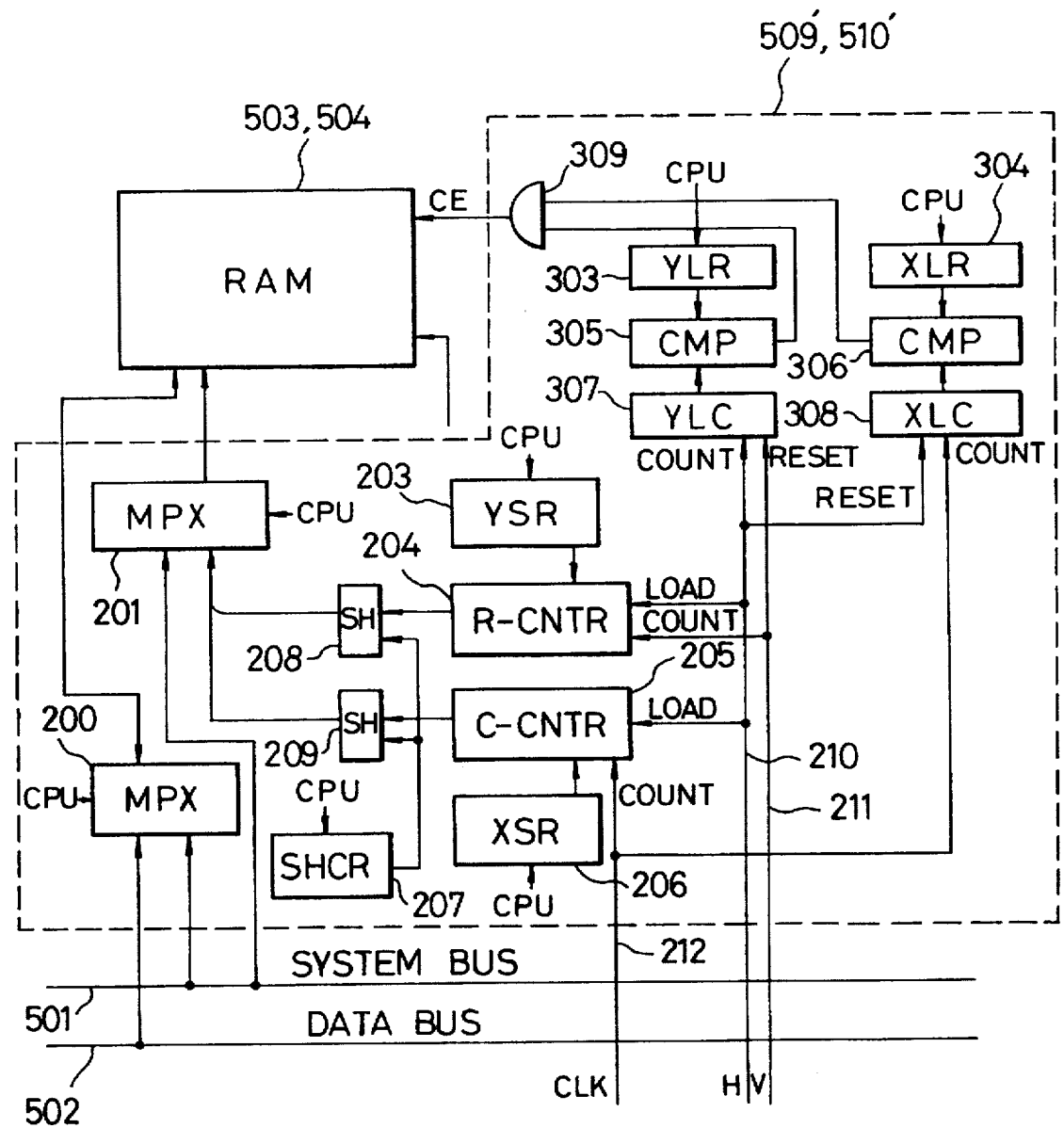
FIG. 15 is a block diagram showing an address generator 509' in an image memory section 513 in the fourth embodiment.

FIG. 15 is a block diagram of an address generator 509' in the image memory section 513 shown in the fourth embodiment. This block diagram applies to an address generator 510' in the image memory section 514. The address generator 509' performs the function of transferring and receiving image date.

In the illustrated arrangement, image data in the image memory 503 is transferred to the image memory 504 at a high rate. In this case, the CPU 512 performs the following initialization.

Image Memory Section 513

XLR 206: 100,

YSR 203: 200,

SHCR 207: 0,

MPX 200: connected to data bus, and

MPX 201: internal address mode.

Image Memory Section 514

XSR 206: 1024,

YSR 203: 1024,

XLR 304: 512,

YLR 303: 1024,

SHCR 207: 0,

MPX 200: connected to data bus, and

MPX 201: internal address mode.

After completion of the above initialization, the CPU 512 starts the circuits. Image data corresponding to 512×1024 pixels, which starts with an address (100, 200) in the image memory 503, is transferred to an area which starts with an address (1024, 1024) in the image memory 504, whereby an equimultiple image is transferred.

[Fifth Embodiment]

A fifth embodiment relates to an arrangement for transferring a set of image data by repeating a partial transfer operation k times.

Figure 16:
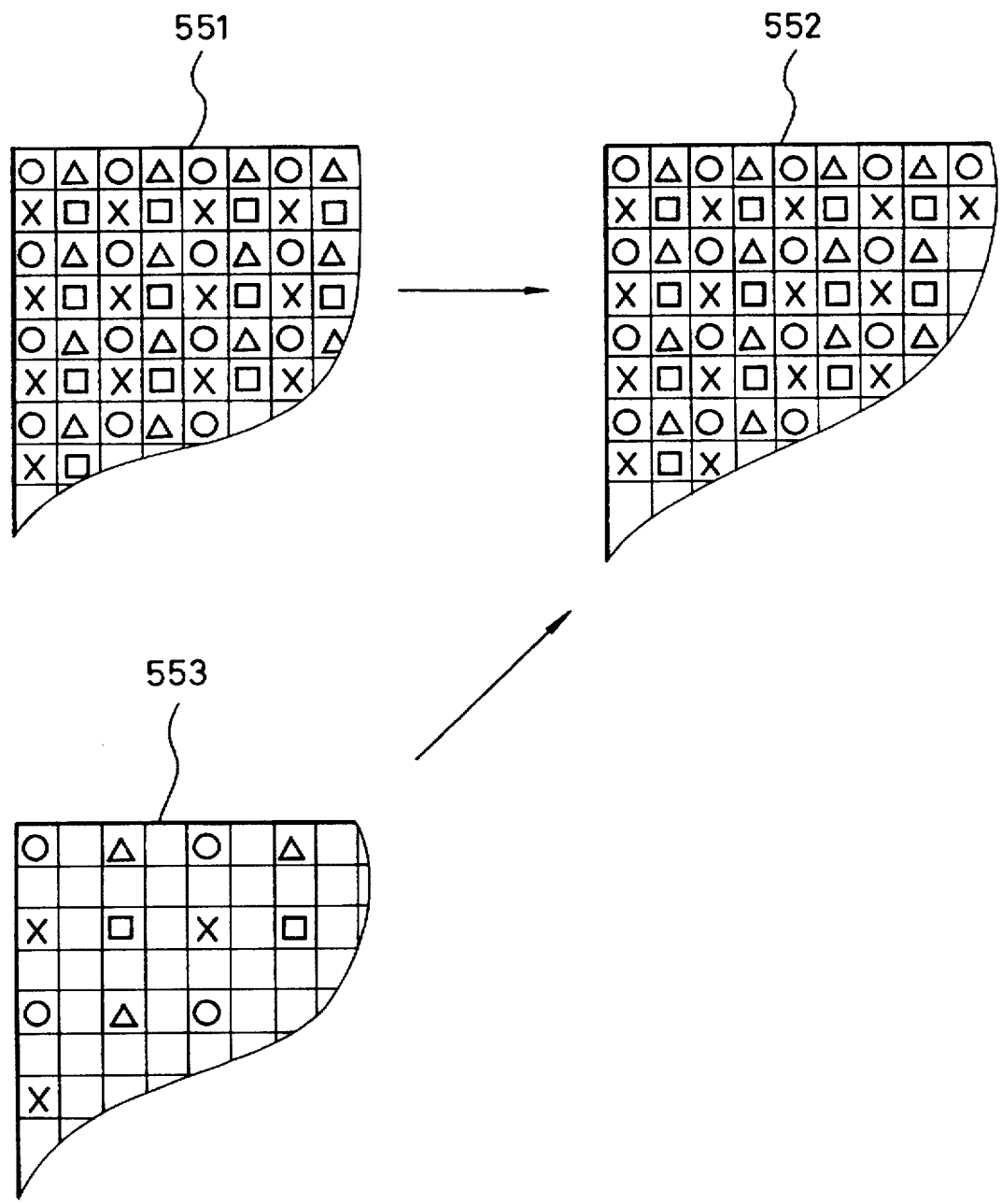
FIG. 16 is a conceptual diagram which serves to illustrate the operation of transferring image data in the fifth embodiment.

FIG. 16 is a conceptual diagram which serves to illustrate the operation of transferring a set of image data in accordance with the fifth embodiment. In the figure, part 551 represents a portion of the image data stored in the image memory 503, and part 552 represents a portion of the image data stored in the video frame memory 507. The contents of the video frame memory 507 are cleared in advance. In the fifth embodiment, if k=4, the image data 551 of the image memory 503 is segmented into blocks each consisting of 2×2 pixels. All the data "o" are transferred in a first transfer cycle; all the data "Δ", in a second transfer cycle; all the data "x", in a third transfer cycle; and all the data "□", in a fourth transfer cycle, whereby image data for four frames are transferred. This transfer method provides the advantage that, upon completion of the first transfer cycle, it is possible to quickly preview the whole of a temporal image consisting of the image data "o" on the monitor 506.

In FIG. 16, one modification of the fifth embodiment is illustrated by the relationship between the image data 553 stored in the image memory 504 and the image data 552 stored in the video frame memory 507. In this modification in which k=4, the image data 553 stored in the image memory 504 is transferred in partially omitted form as illustrated, so that the image data 552 in the video frame memory 507 is reduced to 1/2 in either of the X and Y directions.

Figure 17:
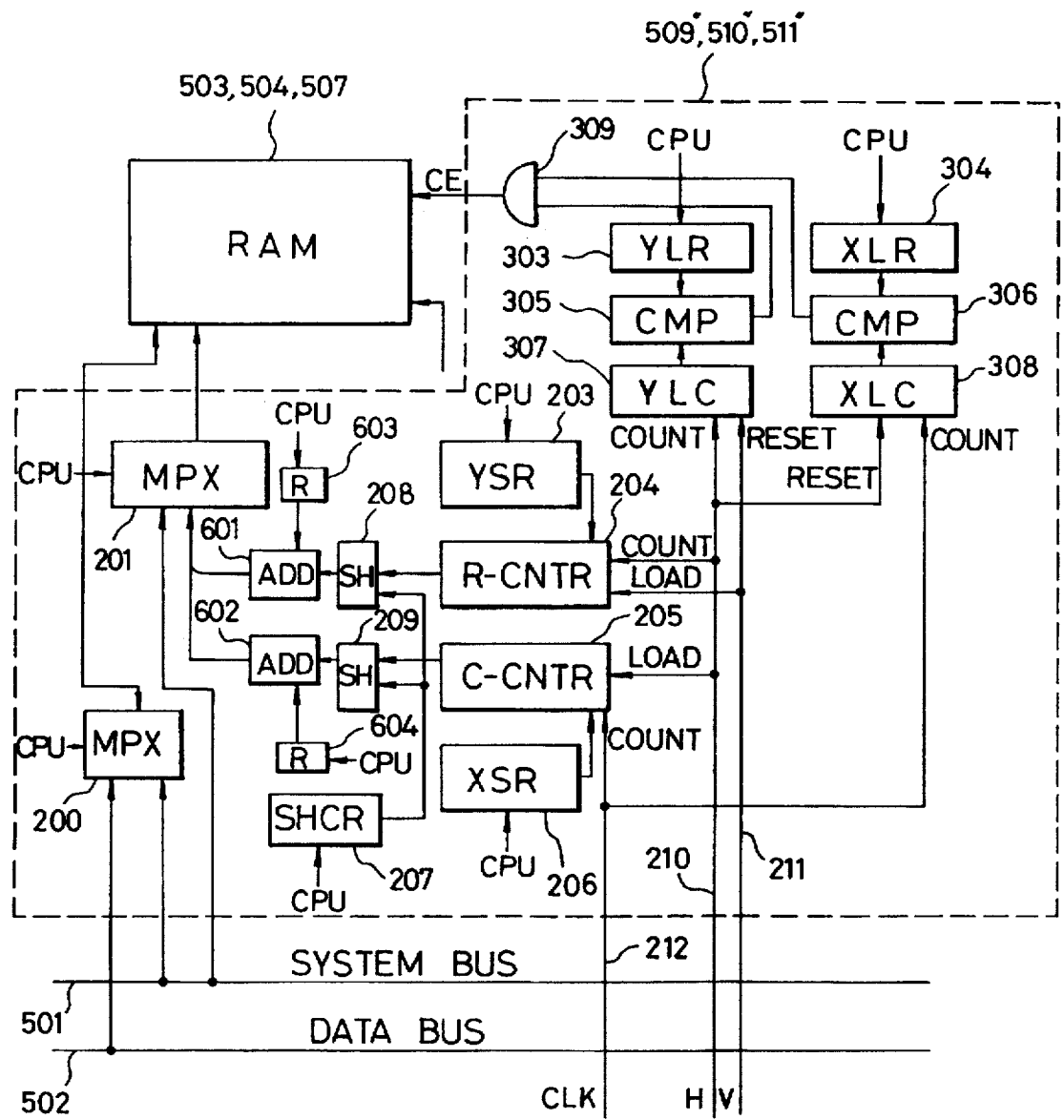
FIG. 17 is a block diagram which shows address generators 509"-511", image memory sections 513, 514 and a display controlling section 505 in the fifth embodiment.

FIG. 17 is a block diagram showing address generators 509"–511" of image memory sections 513, 514 and the display control section 505 in the fifth embodiment. In the figure, registers (R) 603 and 604 are shown. The register (R) 603 holds a data to be added to the address information which passes through the shifter 208. The register (R) 604 holds a data to be added to the address information which passes through the shifter 209. These data are supplied from the CPU 512. Adders 601 and 602 serve to add the address information passed through the shifters 208 and 209 to the contents of the registers 603 and 604, respectively.

Subsequently, specific examples of transfer operation will be explained below.

Equimultiple Transfer of Image Divided in Four Parts

Image data for 1024×1280 pixels which starts with address (0, 0) in the image memory 503 is transferred to an area, which starts with address (0, 0) in the video frame memory 507, in a form in which an equimultiple image is transferred by repeating a partial transfer operation four times. This transfer corresponds to the exchange between the image data 551 and the image data 552 as shown in FIG. 16. In this transfer operation, the CPU 512 executes the following initialization.

Image Memory Section 513

XLR 206: 0,

YSR 203: 0,

SHCR 207: +1,

MPX 200: connected to data bus, and

MPX 201: internal address mode.

The contents of the registers R603 and R604 vary each time one transfer cycle is completed. More specifically, for the transfer of the image data "o", R603: 0 and R604: 0; for the transfer of the image data "Δ", R603: 0 and R604: 1; for the transfer of the image data "x", R603: 1 and R604: 0; and for the transfer of the image data "□", R603: 1 and R604: 1.

Video Frame Memory 507

XSR 206: 0,

YSR 203: 0,

XLR 304: 1024,

YLR 303: 1280,

SCHR 207: +1,

MPX 200: connected to data bus, and

MPX 201: internal address mode.

The contents of the registers R603 and R604 likewise vary each time one transfer cycle is completed. More specifically, for the transfer of the image data "o", R603: 0 and R604: 0; for the transfer of the image data "Δ", R603: 0 and R604: 1; for the transfer of the image data "x", R603: 1 and R604: 0; and for the transfer of the image data "□", R603: 1 and R604: 1.

Thinned-out Transfer of Image Divided into Four Parts

Image data which starts with address (0, 0) in the image memory 504 is transferred to an area which is occupied by 1024×1024 pixels and which starts with address (0, 0) in the video frame memory 507, so that an image divided into four parts is compressed to 1/4. This transfer corresponds to the exchange between the image data 553 and the image data 552 as shown in FIG. 16. In this transfer operation, the CPU 512 executes the following initialization.

Image Memory Section 514

XLR 206: 0,

YSR 203: 0,

SHCR 207: +2,

MPX 200: connected to data bus, and

MPX 201: internal address mode.

The contents of the registers R603 and R604 vary each time one transfer cycle is completed. More specifically, for the transfer of the image data "o", R603: 0 and R604: 0; for the transfer of the image data "o", R603: 0 and R604: 2; for the transfer of the image data "x", R603: 2 and R604: 0; and for the transfer of the image data "□", R603: 2 and R604: 2.

Video Frame Memory 507

XSR 206: 0,

YSR 203: 0,

XLR 304: 1024,

YLR 303: 1024,

SHCR 207: +1,

MPX 200: connected to data bus, and

MPX 201: internal address mode.

The contents of the registers R603 and R604 likewise vary each time one transfer cycle is completed. More specifically, for the transfer of the image data "o", R603: 0 and R604: 0; for the transfer of the image data "Δ", R603: 0 and R604: 1; for the transfer of the image data "x", R603: 1 and R604: 0; and for the transfer of the image data "□", R603: 1 and R604: 1.

[Sixth Embodiment]

Figure 18:
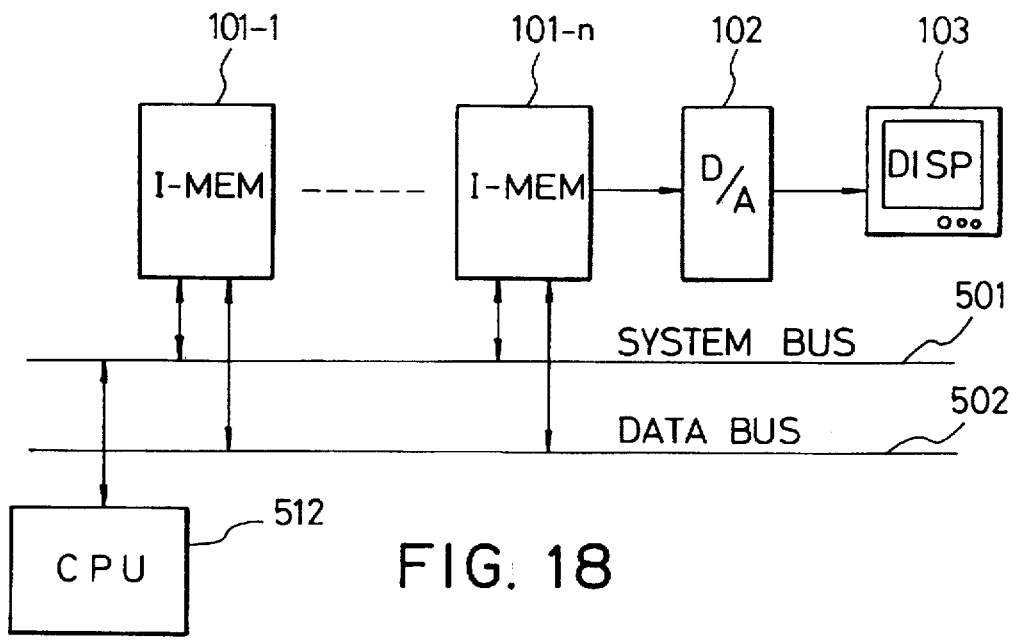
FIG. 18 is a block diagram showing an image processing apparatus to which a sixth embodiment is applied.

FIG. 18 is a block diagram showing an image processing apparatus to which a sixth embodiment of the present invention is applied. As illustrated, image memory sections 101-1 to 101-n are connected to both the system bus 501 and the data bus 502. The image data stored in the image memory section 101-n is subjected to D/A conversion in a D/A converter 102, and the resulting image is displayed on a monitor 103. Such image data is directly written into the image memory section 101-n over the system bus 501 by the CPU 512, or it is transferred from another image memory to the image memory section 101-n over the data bus 502 at a high rate.

In the following explanation, as required, an image memory section from which image data is read is called master memory, while an image memory section to which image data is written is called slave memory.

FIGS. 24(A) and 24(B) are views which serve to illustrate the operation of transferring image data in the sixth embodiment. FIG. 24(A) shows an ordinary type of raster transfer method. As illustrated, image data corresponding to all pixels (p×q) are transferred in the order of the illustrated sequence numbers (1, 2, 3, . . . , pq) which correspond to raster scanning.

FIG. 24(B) shows a four-divided image-data transfer method. In the figure, the image data corresponding to all the pixels (p×q) are divided into small blocks each consisting of (p'×q) pixels. In each transfer cycle, only image data located at a predetermined position in each small block is transferred, and this transfer operation is sequentially repeated with respect to all the positions in each small block. The image data for all the (p×q) pixels is thereby transferred. More specifically, in a first transfer cycle, the image data located at positions 1, 2, 3, . . . , pq/4 are transferred; in a second transfer cycle, the image data located at positions {pq/4}+1, {pq/4}+2, {pq/4}+3, . . . , 2pq/4 are transferred; in a third transfer cycle, the image data located at positions {2pq/4}+1, {2pq/4}+2, {2pq/4}+3, . . . , 3pq/4 are transferred; and, in a fourth transfer cycle, the image data located at positions {3pq/4}+1, {3pq/4}+2, {3pq/4}+3, . . . , pq are transferred. Accordingly, the time required to transfer the image data in one transfer cycle is reduced to 1/4.

Figure 19:
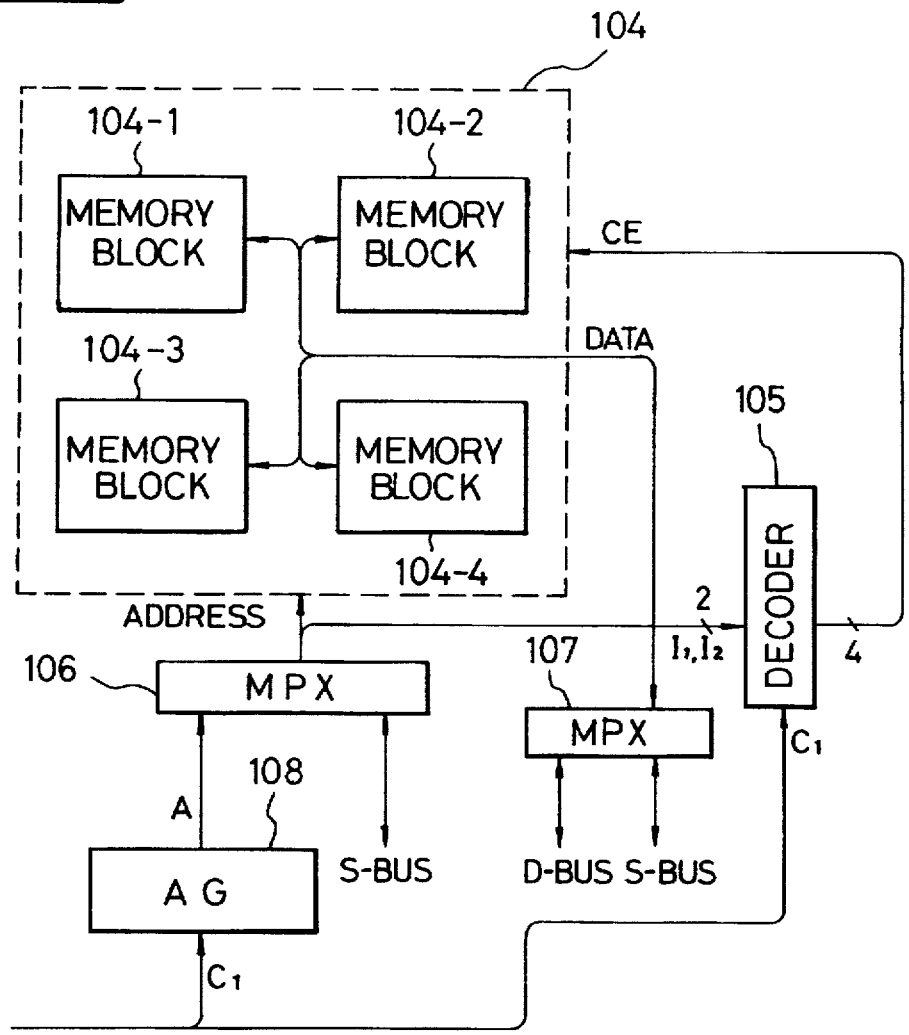
FIG. 19 is a block diagram showing image memory sections 101-1 to 101-n in the sixth embodiment.

FIG. 19 is a block diagram showing the image memory sections 101-1 to 101-n in the sixth embodiment. In the figure, an image memory 104 consists of four memory blocks 104-1 to 104-4. A bidirectional multiplexer (MPX) 107 effects switching of data stream between a path which connects the image memory section 104 and a system bus (S-BUS) 501 and a path which connects the image memory section 104 and a data bus (D-BUS) 502. A multiplexer (MPX) 106 supplies the image memory 104 with an address which is transferred over the system bus 501 or an internal address A which is generated within the illustrated circuit. An address generator (AG) 108 generates the internal address A. A decoder (DECODER) 105 generates a chip enable signal CE to be applied to each of the memory blocks 104-1 to 104-n. This decoder 105 is supplied with a specific bit $I_1$ of a Y address and a specific bit $I_2$ of an X address by an MPX 106.

FIG. 21 shows the truth table used in the decoder 105 in the sixth embodiment. In the illustrated truth table, R/W represents a read/write mode associated with the image memory 104, $I_1$ represents a specific bit in an Y address, $I_2$ represents a specific bit in an X address, $C_1$ represents a control 1 signal, $0_1$ to $0_4$ represent chip enable signals associated with the respective memory blocks 104-1 to 104-4. Each of the chip enable signals assumes a chip enable state at a logic level "0".

Figure 20A:
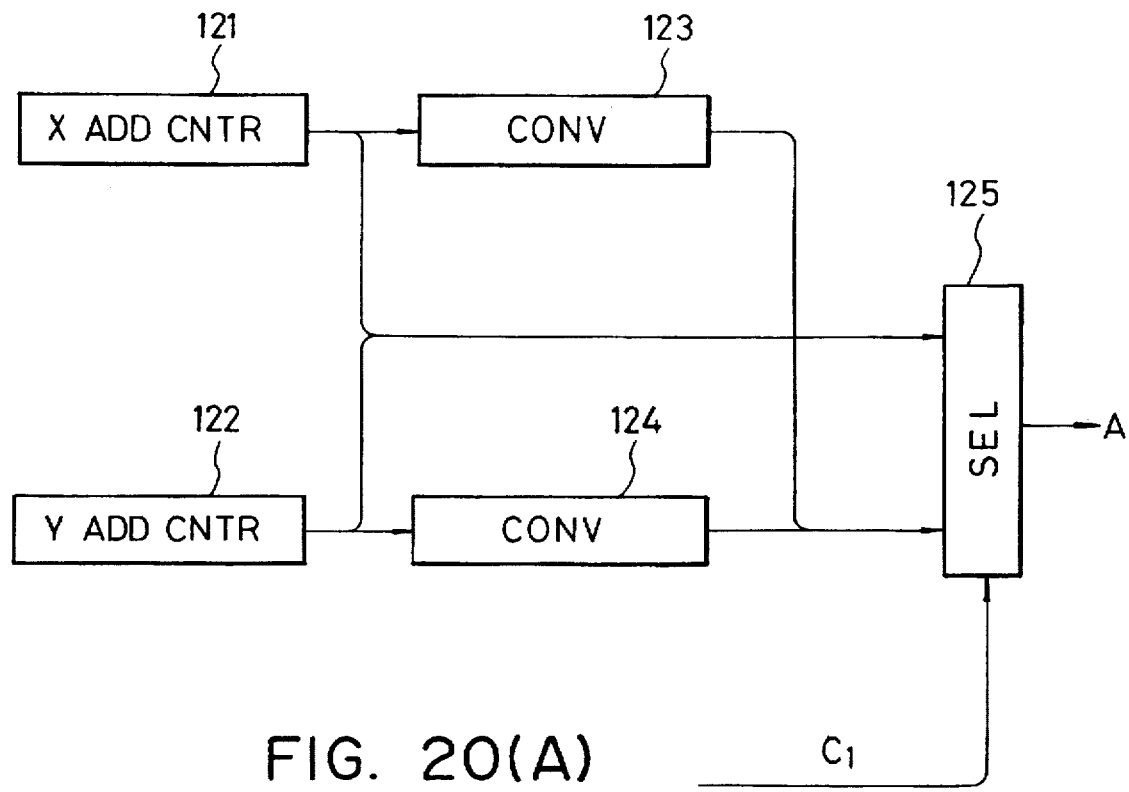
FIG. 20(A) is a block diagram showing an address generator 108 in the sixth embodiment.

FIG. 20(A) is a block diagram which shows the address generator 108 used in the sixth embodiment. As illustrated, the address generator 108 includes an X address counter (X ADD CNTR) 121 for counting address in the X direction, a Y address counter (Y ADD CNTR) 122 for counting addresses in the Y direction, array converters (CONV) 123 and 124 for converting the bit arrays of the corresponding counter outputs, and a selector (SEL) 125 for selectively outputting a non-converted address or a converted address in accordance with the control signal $C_1$.

Figure 20B:
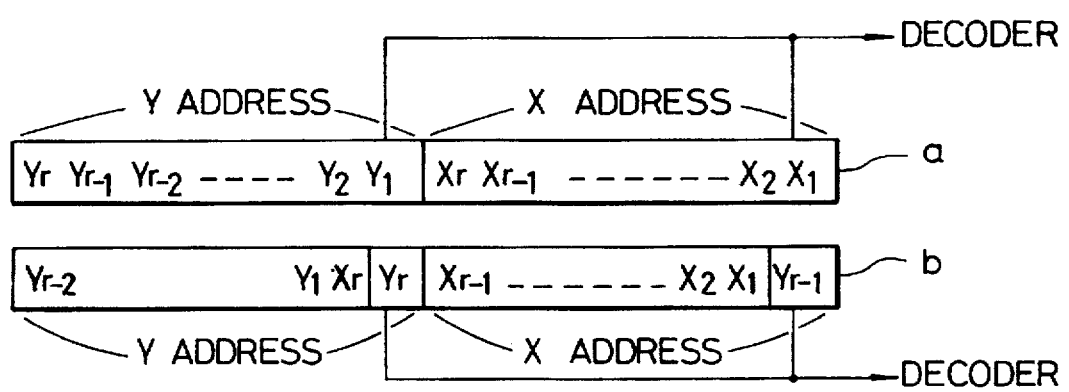
FIG. 20(B) is a diagram showing the manner of address conversion.

FIG. 20(B) is a view showing the manner in which address-array conversion is executed by the array converter. In the figure, part a ($C_1$=0) represents the mode of address (a) which is before array conversion, while part b ($C_1$=1) represents the mode of address (b) which is after array conversion. In the mode of address a, the least significant bits $X_1$ and $Y_1$ of the respective X and Y counters are input to the decoder 105, and the remaining bits serves as an address. Accordingly, if the mode of address a is selected, the individual pixels in one block (2×2) are stored by the respective memory blocks 104-1 to 104-4 in a shared manner. If the mode of address b is selected, the most significant bit Yr and the following bit $Yr_{-1}$ in the Y counter are input to the decoder 105, and the remaining bits serve as an address. Accordingly, in the mode of address b, each of the memory blocks 104-1 to 104-4 stores a quarter of one complete image such as that shown in FIG. 24(A).

The following is an explanation of a specific example of the transfer operation executed in the sixth embodiment.

In the master memory section 101-1, the memory block 104-1 stores the pixels 1 to {pq/4} shown in FIG. 24(B), the memory block 104-2 stores the pixels {pq/4}+1 to {2pq/4}, the memory block 104-3 stores the pixels {2pq/4}+1 to {3pq/4}, and the memory block 104-4 stores the pixels {3pq/4}+1 to {pq}. These contents are read out in the mode of address b and are then written into the slave memory section 101-n in the mode of address b.

More specifically, the initial settings of the slave memory section 101-n are $C1=1$, $R/W=W$, $I_1=0$ and $I_2=0$, and all the CE signals $0_1$–$0_4$ are therefore set to a logic level "0". Accordingly, the same image data 1 to {pq/4} are simultaneously written into each of the memory blocks 104-1 to 104-n in the slave memory section 101-n. Accordingly, after the contents of the memory block 104-1 of the master memory have been completely transferred, if the transferred image data is read into the monitor 103 in the mode of address a, it is possible to provide a low-resolution (1/4) but satisfactory image which allows visual confirmation of the entire image.

Subsequently, the slave memory section 101-n is set to $C_1=1$, $R/W=W$, $I_1=0$ and $I_2=1$, and the CE signal $0_2$ alone is set to a logic level "0". Accordingly, the image data {pq/4}+1 to {2pq/4} are transferred to the memory block 104-2 alone, whereby the resolution of an image displayed on the monitor 103 is improved. Thereafter, when the remaining image data are sequentially transferred to the memory blocks 104-3 and 104-4, a complete image is obtained.

FIG. 25 shows another example of the truth table used in the decoder 105 in the sixth embodiment. In the illustrated truth table, while the master memory is reading image data from the memory block 104-2, the slave memory writes the same image data into the memory blocks 104-2 and 104-3 at the same time. Accordingly, at this point in time, the resolution of the image displayed on the monitor 103 reaches accurately 1/2.

[Seventh Embodiment]

The seventh embodiment relates to another form of the image memory section 101-n used in the seventh embodiment. In the sixth embodiment, the read-out method at the serial port of the image memory section 101-n is modified so that, even during transfer of image data, a low-resolution but satisfactory image can be displayed on a monitor, and a complete image is displayed after completion of the transfer.

Figure 22:
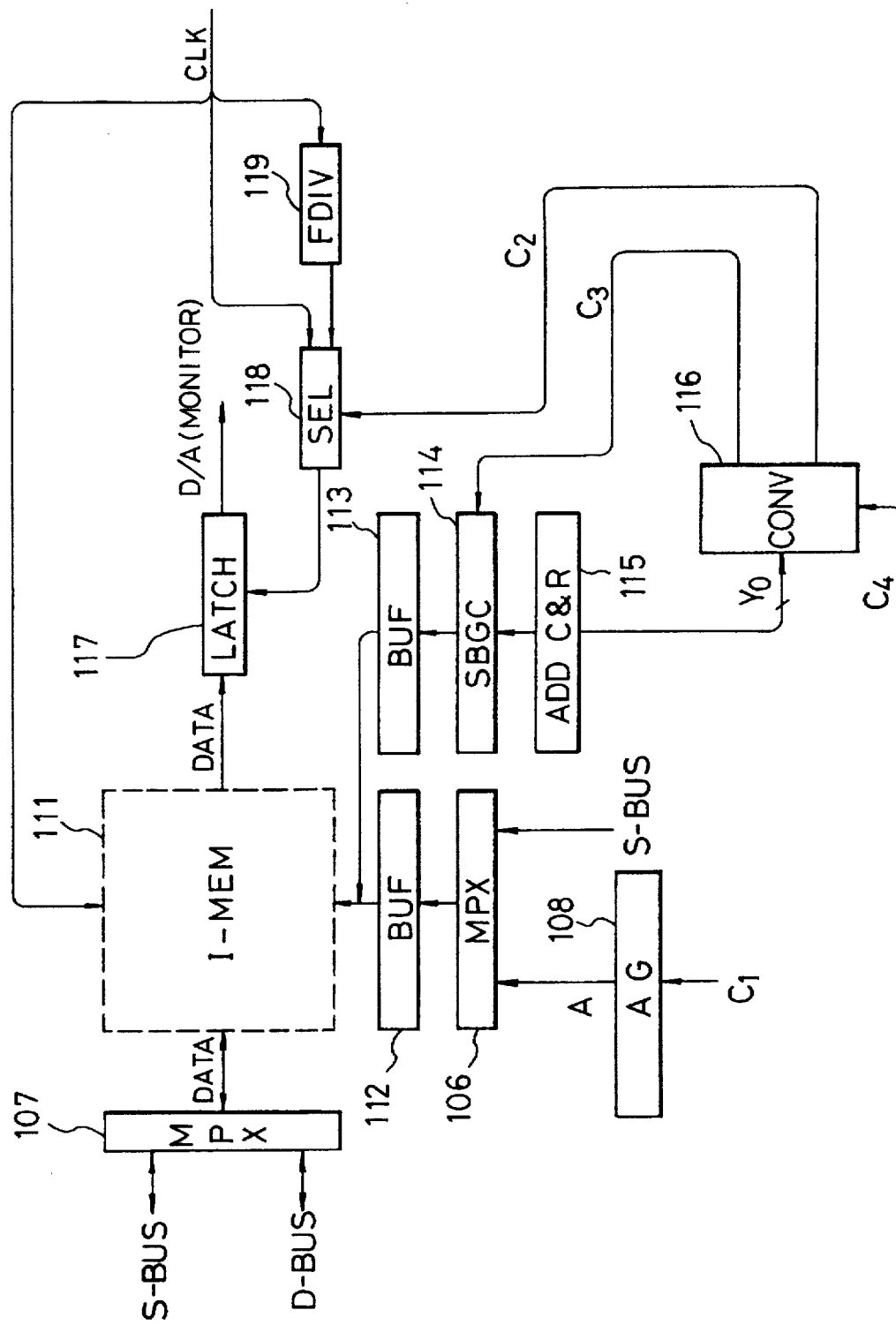
FIG. 22 is a block diagram showing an image memory section 101-n according to the seventh embodiment.

FIG. 22 is a block diagram showing the image memory section 101-n in the seventh embodiment. In the figure, an image memory (I-MEM) 111 consists of a 2-port memory. More specifically, access to the image memory 111 by the CPU 512 (S-BUS), or the transfer of image data between the image memory section and the image memory 111 (D-BUS) is controlled via a data port connected to the MPX 107. The readout of image data from the image memory 111 to the monitor 103 is controlled via a serial port connected to a latch 117.

The following is an explanation of control which is provided over data reading at the serial port.

A selector (SEL) 118 selectively outputs, in accordance with a control signal $C_2$, a pixel clock signal CLK or a frequency-divided clock signal which is divided by two by a frequency divider (FDIV) 119. More specifically, when $C_2=1$, the selector (SEL) 118 outputs the pixel clock signal CLK, while when $C_2=0$, the selector (SEL) 118 outputs the frequency-divided clock signal. A latch 117 latches image data, which is read from the image memory 111 in the X direction, for each pixel or every other pixel in accordance with the clock signal output from the selector 118. A converter (CONV) 116 controls addresses which are read out in the Y direction.

FIG. 23 is a view showing the truth table used in the converter 116 in the seventh embodiment. In the illustrated truth table, $C_4$ corresponds to the control signal $C_4$ shown in FIG. 22, and is supplied from, for example, the CPU 512. $Y_0$ corresponds to the least significant bit (specific bit) in the Y address at the serial port. The signal $C_4$ and the specific bit $Y_0$ are input to the converter 116.

The signal $C_4$ is set in the following manner: $C_4=00$ is held until the transfer of pixels 1 to {pq/4} of FIG. 24(B) has been completed; $C_4=01$ during the transfer of pixels {pq/4}+1 to {2pq/4}; $C_4=10$ during the transfer of pixels {2pq/4}+1 to {3pq/4}; and $C_4=11$ during the transfer of {3pq/4}+1 to {pq}. $C_2$ and $C_3$ correspond to output control signals $C_2$ and $C_3$ of FIG. 22, respectively.

Referring back to FIG. 22, an address counter & register (ADD-C&R) 115 includes a counter section for counting Y-direction readout addresses and a register for determining X-direction readout start addresses. A specific-bit gate circuit (SBGC) 114 performs ANDing of a specific bit $Y_0$ in a Y-direction address and a signal $C_3$. A buffer (BUF) 113 supplies X and Y readout addresses to the image memory 111 in synchronism with a horizontal synchronizing signal from the monitor 103. In accordance with the X and Y readout addresses supplied from the buffer 13, image data are sequentially read out in units of lines.

The following is a specific explanation of the operation of the above embodiment.

In the mode shown in, for example, FIG. 24(B), the transfer of the image data to the image memory 111 is performed in the order: the image data corresponding to the pixels 1–{pq/4}; the image data corresponding to the pixels {pq/4}+1 to {2pq/4}; the image data corresponding to the pixels {2pq/4}+1 to {3pq/4}; and the image data corresponding to the pixels {3pq/4}+1 to {pq}.

Until Completion of 1/4-Image Transfer

As can be seen from the truth table of FIG. 23, $\{Y_0 * C_3\}=0$ (*: logical AND) and $C_2=0$ are obtained. Accordingly, the address bit $Y_0$ in the address counter & register 115 is always held at a 0 level by the operation of the gate circuit 114 and the Y address is therefore updated in the order 0, 2, 4, 6, . . . . . The clock signal of the latch 117 is a clock signal divided by two. Accordingly, one pixel (pixel located at the upper left in each block consisting of 2×2 pixels) is read out twice, i.e., in the X and Y directions so that a rough image corresponding to a 1/2 resolution can be visually confirmed with the monitor.

Until Completion of 2/4-Image Transfer

Since $\{Y_0 * C_3\}=0$ and $C_2=1$, each upper pixel in each block consisting of 2×2 pixels is read out twice in the Y direction so that a rough image having a 1/2 resolution in the Y direction only can be visually confirmed with the monitor.

Until Completion of 3/4-Image Transfer

Since $\{Y_0 * C_3\}=Y_0$ and $C_2=Y_0/$ (/: inverted), for $Y_0=1$, the data relative to the X direction is latched in accordance with a clock signal which is frequency-divided by two, while, for $Y_0=0$, such data is latched in accordance with the pixel clock signal CLK. Accordingly, only the pixel located at the lower right in each block consisting of 2×2 pixels becomes the same as the pixel at the lower left. In this manner, the resolution of the image is further increased.

Until Completion of 4/4-Image Transfer

Since $\{Y_0 * C_3\}=Y_0$ and $C_2=1$, the monitor displays all image data in the image memory 111 with a full resolution.

While the invention has been shown and described with illustrative reference to certain preferred embodiments, it will be understood by those skilled in the art that various alterations and modifications in form and detail may be made therein.

For example, although each of the third to fifth embodiments employ the image memories 503 and 504 each of which is formed from a dynamic RAM (DRAM), the present invention is not limited to this arrangement. For example, a dual port RAM may be employed. If the input and output sides of the serial port of the dual port RAM are used for high-rate transfer of image data, image transfer can be effected by means of the serial port even while data is being read from or written into the system bus via parallel port. Accordingly, the efficiency of image transfer is improved.

In each of the embodiments described above, the dedicated data bus 502 is provided for transfer of image data. However, if the CPU 512 is arranged so that it stops using the system bus 501 or the system bus 501 is disconnected during a certain period only, the system bus 501 can be used to transfer data without the need for the data bus 502.

The memory size of each image memory, the screen size of a usable image display device, the memory size of the video frame memory 507 and the like are not limited to the ones which are used in each of the above embodiments.

As is apparent from the foregoing, in accordance with the present invention, since a simple data bus and unique address generating means are provided, it is possible to transfer data which occupies an arbitrary area in a particular image memory at a high rate. In this case, it is sufficient that the data bus has a bus width which permits transfer of image data (corresponding to a plurality of parallel signal lines or one serial signal line) and several control signals (for example, an image clock signal, a H-sync signal, a V-sync signal and the like).

In accordance with the present invention, skip transfer of image data and transfer of partially omitted image data can be easily performed, whereby the outline of a complete image can be transferred and visually confirmed on a monitor within a time period which is shorter than would otherwise be required.

Moreover, in accordance with the present invention, by adding a predetermined value to a shifted address, it is possible to perform skip transfer of image data and transfer of partially omitted data while shifting the image data in pixel-by-pixel fashion. Accordingly, in each transfer cycle, a high-resolution image is formed.

As many apparently widely different embodiments of the present invention can be made without departing from the spirit and scope thereof, it is to be understood that the invention is not limited to the specific embodiments thereof except as defined in the appended claims.

What is claimed is:

1. A memory-to-memory data transfer apparatus, which transfers data between memories connected to bus means without intervention by a processing means connected to said bus means, comprising:

a plurality of frame memory means connected to the bus means each of which is for storing color component data, of a respective color component, representing each of a plurality of pixels of a color image having a plurality of color components;

reading means for reading color component data in each of the plurality of frame memory means corresponding to a plurality of pixels of color image;

combining means connected to the bus means, for combining the plurality of color component data read by said reading means and for outputting the combined data as color pixel data to the bus means, said combining means including selecting means for selecting, in turn, data of each of the plural color components, in accordance with selection information transmitted to said selecting means utilizing the two most significant bits of an address transmitted on the bus means; and memory means connected to the bus means for storing the combined data output by said combining means, wherein the bus means, connected to said plurality of frame memory means and said memory means, has a bus width sufficient to transmit the color pixel data of the color image.

2. A memory-to-memory data transfer apparatus according to claim 1, wherein said reading means reads out the respective color component data representing each of a plurality of pixels of the color image having the plurality of color component data from said plurality of frame memory means.

3. A memory-to-memory data transfer apparatus according to claim 1, further comprising a plurality of latch means each of which is for latching the respective color component data read out by said reading means.

4. A memory-to-memory data transfer apparatus according to claim 1, wherein each of said plurality of frame memory means stores red component data, green component data and blue component data, respectively.

5. A memory-to-memory data transfer apparatus according to claim 3, wherein said combining means combines the plurality of color component data, each of the plurality of color component data is latched by each of said plurality of latch means respectively.

6. The memory-to-memory data transfer apparatus according to claim 1, further comprising:

display memory means, connected to said bus means, for storing information to be displayed;

first memory control means for controlling said display memory means to read information sequence in the same order as scanning by a display means;

second memory control means for controlling said display memory means to store the information sequence at random;

providing means for providing the display means with the information sequence read by said first memory control means from said display memory means by a scanned unit by the display means; and means for storing the information sequence in said display memory means at arbitrary locations at random by said second memory control means.

7. A memory-to-memory data transfer apparatus, which transfers data between memories connected to bus means without intervention by a processing means connected to the bus means, comprising:

memory means connected to the bus means for storing color pixel data representing a pixel of a color image, said color pixel data including a plurality of color component data;

reading means for reading from said memory means color pixel data representing a pixel of the color image;

separating means connected to the bus means for separating the color pixel data read out by said reading means into a plurality of sets of color component data, each of the sets of color component data representing a respective color component;

selection information input means for inputting selection information into the bus means utilizing the two most significant bits of an address signal transmitted on the bus means for use in separating desired pixel data stored in said memory means into the plurality of color component data; and a plurality of frame memory means, connected to the bus means, each of which is for storing color component data, of a respective color component, separated by said separating means according to the selection information, wherein the bus means, connected to said plurality of frame memory means and said memory means, has a bus width sufficient to transmit the color pixel data of the color image.

8. A memory-to-memory data transfer apparatus according to claim 7, wherein said reading means reads out the color pixel data corresponding to each of a plurality of pixels of the color image.

9. A memory-to-memory data transfer apparatus according to claim 7, further comprising latching means for latching the color pixel data read out by said reading means.

10. A memory-to-memory data transfer apparatus according to claim 7, wherein said color memory means stores red component data, green component data and blue component data corresponding to each pixel.

11. A memory-to-memory data transfer apparatus according to claim 9, wherein said separating means separates the color pixel data latched by said latching means into each color component.

12. The memory-to-memory data transfer apparatus according to claim 7, further comprising:

display memory means, connected to said bus means and having a plurality of memory locations for storing information, for being able to be serially read and to be written at random;

display control means for serially reading the information from said display memory means and for controlling a display means to display the information; and memory control means for controlling said memory means to store the information at an arbitrary memory location of the plurality of memory locations of said memory means.

13. An information processing apparatus, comprising:
a CPU for processing;

a plurality of frame memory means each of which is for storing color component data, of a respective color component, representing a pixel of a color image having a plurality of color components;

memory means for storing color pixel data including a plurality of color component data;

bus means connecting said CPU, said plurality of frame memory means and said memory means;

selecting means for selecting color component data from among the plurality of color component data representing the pixel of the color image in accordance with selection information transmitted from said CPU via said bus means utilizing the two most significant bits of an address signal transmitted on said bus means;

means for reading the color component data, as selected by said selecting means, from each of the plurality of frame memory means without intervention by said CPU;

combining means for combining the color component data so read out and for outputting the combined data as color pixel data to said memory means;

means for reading from said memory means the color pixel data representing a pixel of the color image without intervention by said CPU;

means for separating the color pixel data so read out into each of a plurality of color components data and storing respective color components data thus separated into each of said plurality of frame means in accordance with selection information transmitted from said CPU via said bus means utilizing the two most significant bits of an address signal transmitted on said bus means.

14. The information processing apparatus according to claim 13, further comprising display memory means connected to said bus means.

15. The information processing apparatus according to claim 13, further comprising:

display memory means, connected to said bus means and having a plurality of memory locations for storing information, which comprises a first access mode and a second access mode for storing the information in a first sequence or in a second sequence, respectively;

display control means for serially reading information from said display memory means in the first sequence in the first access mode and controlling the display means to display the information; and memory control means for controlling said memory means to store the information at an arbitrary memory location of the plurality of memory locations in the second sequence in the second access mode.

16. The information processing apparatus according to claim 13, further comprising:

display memory means, connected to said bus means and having a plurality of memory locations for storing information, which comprises a first access port and a second access port for reading the information in a first sequence or for storing the information in a second sequence, respectively;

display control means for serially reading information from said display memory means via the first access port in the first sequence, and controlling the display means to display the information; and memory control means for controlling said memory means to store the information at an arbitrary memory location of the plurality of memory positions via the second access port in the second sequence.

17. The information processing apparatus according to claim 13, further comprising:

visualizing means for visualizing pixel information by raster scanning;

display memory means, connected to said bus means and having a plurality of locations to store information corresponding to a plurality of raster line in order to store information to be visualized by said visualizing means, which reads the information in accordance with a raster scanning order and stores the information by a pixel unit;

visualization control means for reading the information from the plurality of memory locations of said display memory means in raster scanning order, and for controlling said visualizing means to visualize the information; and memory control means for controlling said display memory means to store the pixel information by a pixel unit.

18. The apparatus according to claim 13, wherein said bus means provides address information for specifying a location of the color component data to be read by said means for reading the color component data and a location of the color component data to be stored by said means for selecting and storing, and said selection information is included in one or more predetermined digits of the address information.

* * * * *

UNITED STATES PATENT AND TRADEMARK OFFICE
CERTIFICATE OF CORRECTION

PATENT NO. : 5,721,884

DATED : February 24, 1998

INVENTOR(S): JUNICHI SHISHIZUKA ET AL.

Page 1 of 4

It is certified that error appears in the above-identified patent and that said Letters Patent is hereby corrected as shown below:

ON THE COVER PAGE:

At Item [56], "References Cited"

U.S. PATENT DOCUMENTS, "Dahymple et al." should read --Dalrymple et al.--.

At Item [57], "ABSTRACT"

Line 6, "is" should read --are--;
Line 11, "The" should read --An embodiment of the--;
Line 12, "may have" should read --includes--;
Line 16, "form," should read --forms,-- and "or" should read --and--; and
Line 17, "or" should read --and--.

COLUMN 1:

Line 11, "to" should read --to a--.

COLUMN 3:

Line 17, "embodiment,the" should read --embodiment, the--;
Line 27, "embodiment,the" should read --embodiment, the--.

UNITED STATES PATENT AND TRADEMARK OFFICE
CERTIFICATE OF CORRECTION

PATENT NO. : 5,721,884

DATED : February 24, 1998

INVENTOR(S): JUNICHI SHISHIZUKA ET AL.

It is certified that error appears in the above-identified patent and that said Letters Patent is hereby corrected as shown below:

COLUMN 4:

Line 66, "store" should read --stores--.

COLUMN 5:

Line 57, "is," should read --are,--; and
Line 60, "32 bit" should read --32-bit--.

COLUMN 6:

Line 17, "Step 7" should read --Step S7--;
Line 18, "Steps 7 and 8." should read --Steps S7 and S8.--;
Line 19, "Steps 7 and 8," should read --Steps S7 and S8,--.

COLUMN 9:

Line 4, "(IMEM(s))" should read --(I-MEM(s))--.

UNITED STATES PATENT AND TRADEMARK OFFICE
CERTIFICATE OF CORRECTION

PATENT NO. : 5,721,884
DATED      : February 24, 1998
INVENTOR(S): JUNICHI SHISHIZUKA ET AL.

It is certified that error appears in the above-identified patent and that said Letters Patent is hereby corrected as shown below:

COLUMN 13:

Line 26, "data "o"," should read --data "Δ"--.

COLUMN 14:

Line 52, "address" should read --addresses--.

COLUMN 16:

Line 34, "buffer 13," should read --buffer 113,--.

COLUMN 18:

Line 34, "wherein" should read --wherein when--.

COLUMN 19:

Line 27, "color" should be deleted.

UNITED STATES PATENT AND TRADEMARK OFFICE
CERTIFICATE OF CORRECTION

PATENT NO. : 5,721,884

DATED : February 24, 1998

INVENTOR(S): JUNICHI SHISHIZUKA ET AL.

It is certified that error appears in the above-identified patent and that said Letters Patent is hereby corrected as shown below:

COLUMN 20:

Line 6, "CPU;" should read --CPU; and--;
Line 54, "line" should read --lines--.

Signed and Sealed this

Seventeenth Day of November, 1998

Attest:

BRUCE LEHMAN

Attesting Officer      Commissioner of Patents and Trademarks